(12) United States Patent
Haga et al.

(10) Patent No.: US 9,785,239 B2
(45) Date of Patent: Oct. 10, 2017

(54) DISPLAY DEVICE AND ELECTRONIC APPARATUS

(71) Applicant: NLT TECHNOLOGIES, LTD., Kawasaki, Kanagawa (JP)

(72) Inventors: Hiroshi Haga, Kanagawa (JP); Futoshi Nakanishi, Kanagawa (JP); Naoyasu Ikeda, Kanagawa (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 0 days.

(21) Appl. No.: 14/954,341

(22) Filed: Nov. 30, 2015

(65) Prior Publication Data

US 2016/0154462 A1 Jun. 2, 2016

(30) Foreign Application Priority Data

Dec. 1, 2014 (JP) ................. 2014-243550

(51) Int. Cl.
*G06F 3/01* (2006.01)
*G06F 3/047* (2006.01)
(Continued)

(52) U.S. Cl.
CPC .............. *G06F 3/016* (2013.01); *G06F 3/042* (2013.01); *G06F 3/047* (2013.01); *G06F 3/0412* (2013.01); *G06F 3/0414* (2013.01); *G06F 3/0416* (2013.01)

(58) Field of Classification Search
CPC ...... G06F 3/016; G06F 3/0412; G06F 3/0414; G06F 3/0416; G06F 3/042; G06F 3/047; G06F 3/041
See application file for complete search history.

(56) References Cited

U.S. PATENT DOCUMENTS

2005/0184971 A1 8/2005 Ogino et al.
2010/0188354 A1* 7/2010 Tamura ............... G02F 1/13338
345/173
(Continued)

FOREIGN PATENT DOCUMENTS

JP 2004-077887 A 3/2004
JP 2007-034991 A 2/2007
(Continued)

OTHER PUBLICATIONS

Extended European Search Report issued in European Application No. 15197354.2 dated Apr. 25, 2016.
(Continued)

*Primary Examiner* — Dmitriy Bolotin
(74) *Attorney, Agent, or Firm* — Sughrue Mion, PLLC

(57) ABSTRACT

To provide a display device and the like capable of assisting operations by effectively presenting a sense of texture to the skin of human beings while suppressing generation of unpleasant noises. The display device includes: a visual sense display unit which displays an operation screen to be a target of touch operations done by a user by image signals supplied from outside; and a plate-type tactual sense presenting unit which is disposed on the upper side of the visual sense display unit and presents a tactual sense that can be perceived by the user on the operation screen. The tactual sense presenting unit includes X-electrodes and Y-electrodes which exhibit transparency for visible light rays and operate by voltage signals supplied from outside, and a resin exhibiting transparency for visible light rays is filled in a layered-state gap between the visual sense display unit and the tactual sense presenting unit.

13 Claims, 26 Drawing Sheets

(51) Int. Cl.
*G06F 3/041* (2006.01)
*G06F 3/042* (2006.01)

(56) References Cited

U.S. PATENT DOCUMENTS

| | | | |
|---|---|---|---|
| 2011/0187960 A1 | 8/2011 | Kobayashi et al. | |
| 2012/0162143 A1* | 6/2012 | Kai | G06F 1/1626 345/177 |
| 2012/0211080 A1* | 8/2012 | Niiyama | C08F 290/067 136/259 |
| 2013/0106765 A1 | 5/2013 | Beecher et al. | |
| 2013/0307789 A1 | 11/2013 | Karamath et al. | |
| 2014/0022217 A1 | 1/2014 | Wenger | |
| 2015/0314573 A1* | 11/2015 | Niiyama | B32B 7/12 428/78 |
| 2016/0262273 A1* | 9/2016 | Fujita | G06F 1/18 |
| 2017/0169914 A1* | 6/2017 | Sekitani | H01B 1/24 |

FOREIGN PATENT DOCUMENTS

| | | |
|---|---|---|
| JP | 2008-123429 A | 5/2008 |
| JP | 2010-231609 A | 10/2010 |
| JP | 2011-053745 A | 3/2011 |
| JP | 2011-248884 A | 12/2011 |
| JP | 2012-027765 A | 2/2012 |

OTHER PUBLICATIONS

Hiroshi Haga et al. "Electrostatic Tactile Display Using Beat Phenomenon of Voltage Waveforms", NLT Technologies, Ltd. Kanagawa, Japan. Jun. 1, 2014.

"Senseg Technology" searched on Aug. 12, 2014, Senseg HQ, Internet URL:http://senseg.com/technology/senseg-technology.

Keyman's Net, "What is Tactual Sense Feedback Technique?", Apr. 6, 2011, Recruit Marketing Partners Inc., searched on Aug. 12, 2014, Internet URL: http://www.keyman.or.jp/at/30004013/.

* cited by examiner

FIG. 2C

| SAMPLES | ELASTIC MODULUS (kPa) | DISPLAY UNEVENNESS |
|---|---|---|
| A | 7 | ○ |
| B | 40 | ○ |
| C | 43 | ○~△ |
| D | 60 | ○~△ |
| E | 100 | △~× |
| F | 1100 | △~× |
| G | 3000 | △ |

○ : NO DISPLAY UNEVENNESS,
△ : SLIGHT DISPLAY UNEVENNESS,
× : CLEAR DISPLAY UNEVENNESS

FIG. 2E
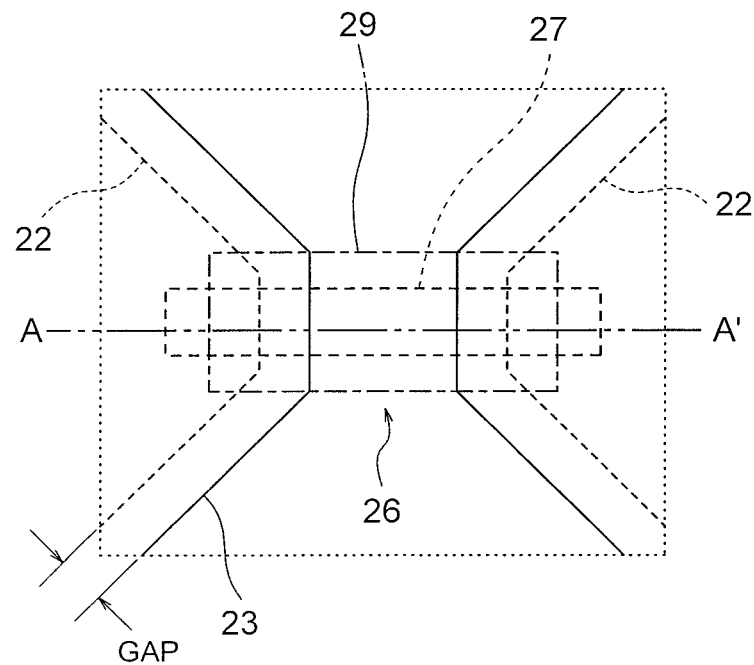
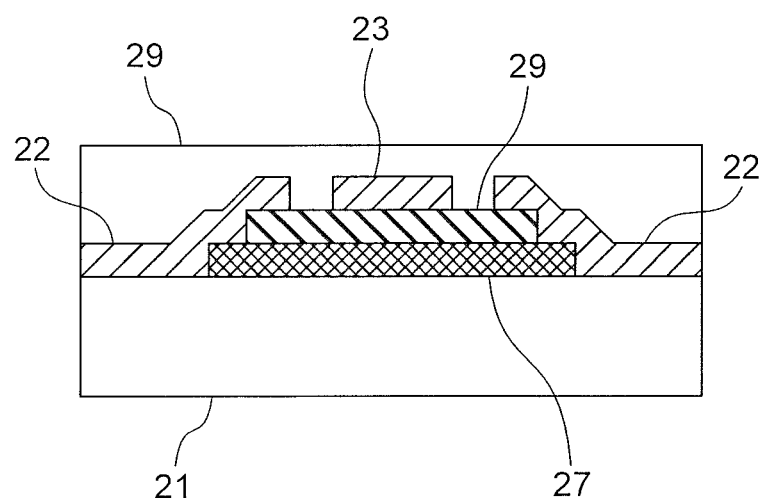

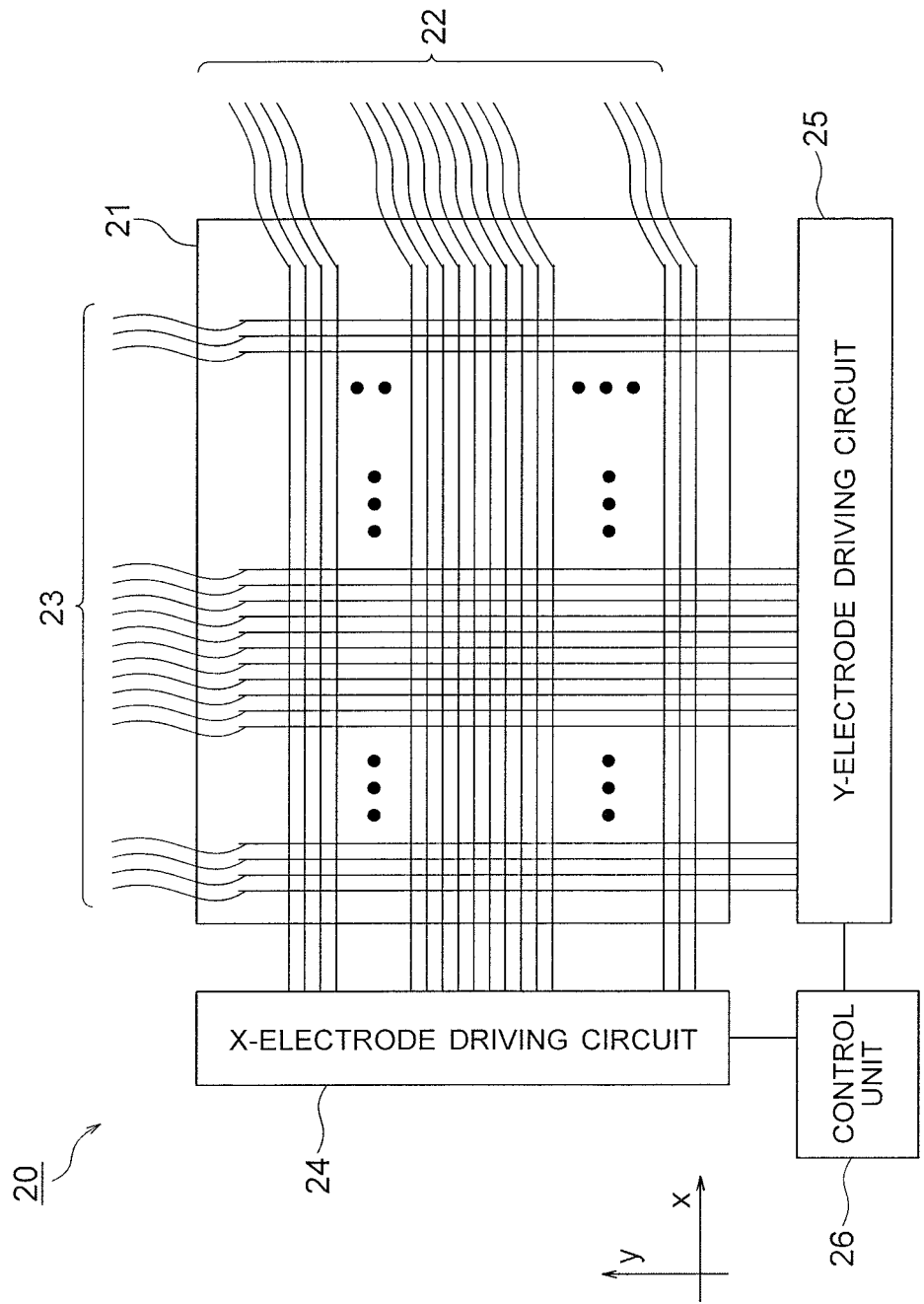

DISPLAY DEVICE AND ELECTRONIC APPARATUS

CROSS-REFERENCE TO RELATED APPLICATION

This application is based upon and claims the benefit of priority from Japanese patent application No. 2014-243550, filed on Dec. 1, 2014, the disclosure of which is incorporated herein in its entirety by reference.

BACKGROUND OF THE INVENTION

1. Field of the Invention

The present invention relates to a display device and an electronic apparatus. More specifically, the present invention relates to a display device and the like capable of assisting operations by effectively presenting a sense of texture to the skin of human beings.

2. Description of the Related Art

Conventionally, a display device on which a touch panel with which input can be done by fingers is loaded contributes to achieving user-friendly interactive operability by being mounted to a system that controls the display content and the apparatus actions according to the input. Thus, electronic apparatuses to which a touch panel is mounted such as smartphones, tablet terminals, and the like are being rapidly spread. Further, there are many of such types with a touch panel being mounted among the conventionally existing electronic apparatuses such as personal computers.

In the meantime, apparatuses provided with independent operation keys such as a remote controller of a television receiver, a conventional type mobile phone terminal (feature phone) can be operated just by memorizing positions and layout of the operation keys without relying on the visual sense. However, the surface of the display device with a touch panel is evenly hard, so that same tactual senses are felt by touching any of the sections displayed on the screen.

Thus, it is practically impossible to perceive which part of the touch panel is to be touched to make an effective input or to know whether or not an effective input is done without relying on a visual sense (without looking at the panel). This causes such an issue that the electronic apparatuses such as smartphones which include a touch-panel display device cannot be used by those with impaired vision. Furthermore, the fact that those electronic apparatuses cannot be operated without relying on the visual sense results in deteriorating the usability for operating the electronic apparatuses for health people.

As the techniques intended to improve such point and improve the usability by also using a tactual sense in addition to a visual sense, there are following techniques. Japanese Unexamined Patent Publication 2011-248884 (Patent Document 1) discloses a technique with which: electrodes are embedded in specific positions on a front surface of a display device; and tactual senses (a sense of texture, a sense of coarseness) are presented to the finger of the user who traces the device surface by an electrostatic force generated between the electrodes and the user by voltage signals supplied to the electrodes.

With this technique, even those with impaired vision can perceive the position of a displayed object that is a target of an input operation on an operation screen displayed in the device by utilizing a sense of texture through giving the sense of texture that can be perceived by the fingers of human beings at the sections where the electrodes are embedded.

However, with this technique, a sense of texture is also given to the wirings provided for transmitting the voltage signals to the electrodes. Especially, a large number of electrodes are embedded to give a sense of texture to a large number of sections, so that complicated wirings are required. Thus, a sense of texture is also given to undesired sections.

Further, this technique is capable of giving a sense of texture only to the section where the electrode is embedded in advance. Changing the positions and the number of sections where a sense of texture is presented according to the displayed object requires rearrangement of the electrodes, so that it is practically impossible.

Further, Japanese Unexamined Patent Publication 2007-034991 (Patent Document 2) discloses a technique which applies oscillation by using a piezoelectric actuator from a side face of a movable panel unit that is formed by integrating a touch panel and a display device. Japanese Unexamined Patent Publication 2008-123429 (Patent Document 3) also discloses a technique which applies oscillation by using a piezoelectric actuator to a touch-panel display device as in the case of Patent Document 2, which is a technique having its feature in the oscillation waveform.

Further, Japanese Unexamined Patent Publication 2010-231609 (Patent Document 4) discloses a technique which applies oscillation to a touch-panel display device not by using audible frequencies but by using ultrasonic waves. Japanese Unexamined Patent Publication 2011-053745 (Patent Document 5) is also a technique which applies oscillation to a touch-panel display device by using a piezoelectric element, which is a technique having its feature in the piezoelectric element mounting structure.

Further, Japanese Unexamined Patent Publication 2012-027765 (Patent Document 6) is a technique with which a plurality of actuators formed with a piezoelectric film are disposed under a touch panel, which is a technique having its feature in the pattern, the frequency, and the like for oscillating each of the actuators. Disclosed in "Senseg Technology" searched on Aug. 12, 2014, Senseg HQ, Internet <URL: http://senseg.com/technology/senseg-technology> (Non-Patent Document 1) and Keyman's Net "What is "Tactual Sense Feedback Technique" ?" Apr. 6, 2011, Recruit Marketing Partners Inc., searched on Aug. 12, 2014, Internet <URL: http://www.keyman.or.jp/at/30004013/> (Non-Patent Document 2) is a technique which "gives a tactual sense to the user by controlling the electric charge of a film without using mechanical oscillation". Further, Japanese Unexamined Patent Publication 2004-077887 (Patent Document 7) discloses an example of a technique which laminates a touch panel and a display device by using an optical elastic resin.

SUMMARY OF THE INVENTION

The following analysis has been made by the present inventors. As depicted in Patent Document 1 or Non-Patent Document 1 mentioned above, there is an existing technique which assists operations through: providing a supporting substrate, electrodes joined to the supporting substrate, and an insulating film covering the electrodes; and laminating a visual sense display with a tactual sense presenting panel structured to present a tactual sense to a user by an electrostatic force generated between the electrodes and the user by a voltage signal applied to the electrodes from outside, thereby allowing the user to perceive a tactual sense with a finger.

However, when the inventors of the present invention, et al. actually created an electronic apparatus of such laminated structure of a tactual sense presenting panel and a visual sense display on an experimental basis, it was verified that the user can perceive a tactual sense with the finger while there was also an issue of sounding generated at the same time. The sounding was generated when the user traced the tactual sense presenting panel with the finger, i.e., when the user slid the finger on the tactual sense presenting panel. In the meantime, the sounding was not generated when the user did not trace the panel. The details of the experimental apparatus will be described more in latter paragraphs.

The issue of sounding is beyond expectation for the inventors, et al. of the present invention. It is because the experimentally created tactual sense presenting panel has a structure in which electrodes formed with ITO (Indium Tin Oxide) deposited on the supporting substrate by sputtering and an organic insulating film formed by spin coating are piled up, so that there is no mechanically oscillating structure and there is no source for generating sounding (acoustic noise).

Further, as the factors for not being able to expect the issue of sounding by the inventors, et al. of the present invention, there are also the depictions written in Patent Document 1 and Non-Patent Document 1. Written in Patent Document 1 is that "there is no physical movement in the embodiment of the present invention, so that the electric oscillation surface is silent" (paragraph 0111 of Patent Document 1), which means that there is no issue of noise. Written in Non-Patent Document 1 is that "Unlike effects created by mechanical vibration and piezo solutions, Senseg is silent", which means that there is no issue of noise as in the case of Patent Document 1.

However, techniques capable of overcoming such issue are not depicted in any of Patent Documents 1 to 7 and Non-Patent Documents 1 to 2 mentioned above. In Patent Document 1 and Non-Patent Document 1, it is depicted that the tactual sense presenting device which is structured by including the supporting substrate, the electrodes joined to the supporting substrate, and the insulating film covering the electrodes and structured to present a tactual sense to the user by the electrostatic force generated between the electrodes and the user by the voltage signal applied to the electrodes from outside is "silent". Thus, presence of such issue itself is denied. In practice, however, such issue of sounding occurs in the tactual sense presenting unit in a form depicted in FIG. 1 of Patent Document 1.

Depicted in Patent Document 5 is a mounting structure of a tactual sense feedback type touch panel that is formed by superimposing a display element and a touch panel having a piezoelectric element attached to its back face fringe part. It is designed to support the touch panel by a frame-like supporting part which supports the touch panel back face fringe part and to provide an air layer between the touch panel and the display device to transmit "oscillation of the piezoelectric element without having attenuation" to the touch panel. That is, this is not anything that "overcomes the issue of sounding".

It is therefore an exemplary object of the present invention to provide a display device and an electronic apparatus capable of improving the ambience by mutual effects of a visual sense and a tactual sense or capable of assisting operations through presenting a sense of texture to the skin of the human beings effectively while suppressing generation of unpleasant noises.

In order to achieve the foregoing object, the display device according to the present invention is a display device, which includes: a plate-type visual sense display unit which displays a screen by an image signal supplied from outside; and a plate-type tactual sense presenting unit which is disposed to oppose to the visual sense display unit and presents a tactual sense that can be perceived by a user on the screen, wherein: the tactual sense presenting unit includes electrodes and an insulating film that covers the electrodes and is structured to present the tactual sense to the user by generating an electrostatic force between the electrodes and the user by a voltage signal given to the electrodes from outside; and an elastic body exhibiting transparency for a visible light ray is filled in a gap between the visual sense display unit and the tactual sense presenting unit.

As described above, the present invention is designed as a structure in which the resin exhibiting transparency for visible light rays is filled between the tactual sense presenting unit and the visual sense display unit. Thus, as an exemplary advantage according to the invention, it is possible to suppress oscillation of the entire surface of the tactual sense presenting panel when mechanical oscillation generated by deformation of the finger is transmitted to the larger-area tactual sense presenting panel and to eliminate the space for causing resonance without spoiling both display on the screen and presentation of the tactual sense.

This makes it possible to provide the display device and the electronic apparatus exhibiting such excellent feature that it is possible to improve the ambience by mutual effects of a visual sense and a tactual sense or to assist operations through presenting a sense of texture to the skin of the human beings effectively while suppressing generation of unpleasant noises.

BRIEF DESCRIPTION OF THE DRAWINGS

FIG. 2C is an explanatory chart showing the results of experiments done by the inventors, et al. of the present invention regarding the elasticity modulus of a resin shown in FIG. 2A;

FIG. 2E is an explanatory chart showing an enlarged view of the structure of a mutual connection part between the X-electrode and the Y-electrode shown in FIG. 2A;

FIG. 3A is an explanatory chart showing a plane view of the structure of the tactual sense presenting unit shown in FIG. 1 and FIG. 2;

DETAILED DESCRIPTION OF THE
PREFERRED EMBODIMENTS (Technique as Premise)

Figure 13:
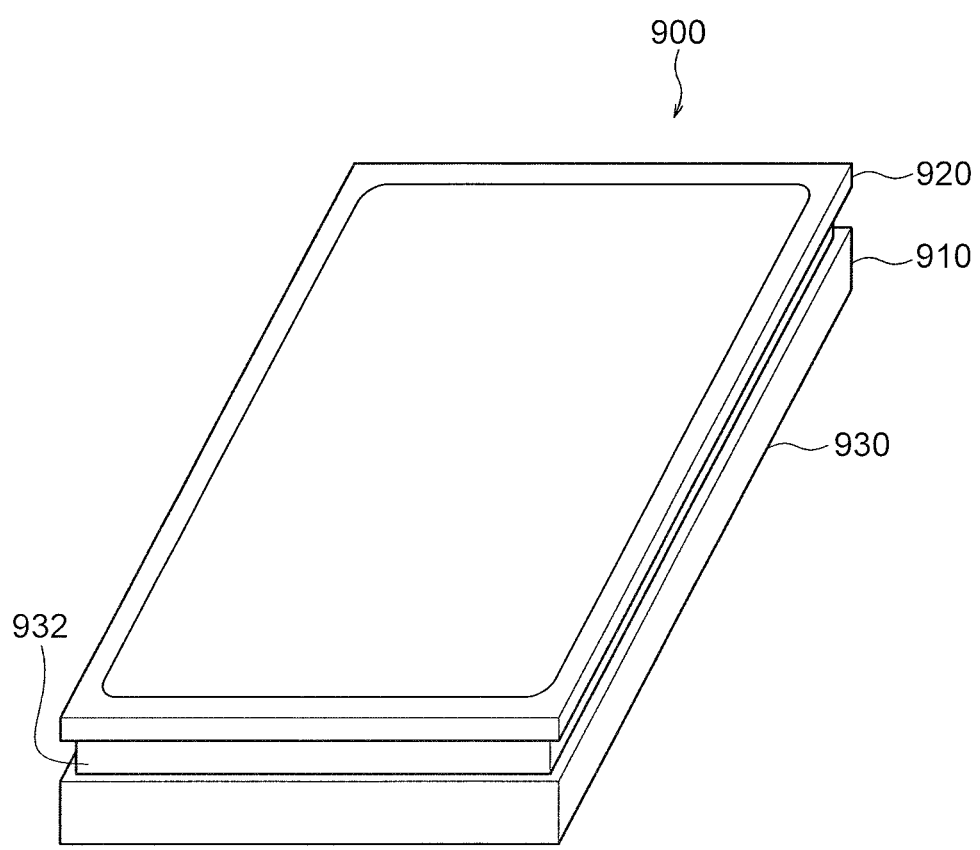
FIG. 13 is a perspective view showing the structures of a display device according to a technique that is the premise of the present invention experimentally created by the inventors, et al. of the present invention.

FIG. 13 is a perspective view showing structures of a display device 900 according to a technique that is a premise of the present invention experimentally created by the inventors, et al. of the present invention. The display device 900 is formed by stacking a visual sense display unit 910 and the tactual sense presenting unit 920.

The display device 900 is what is called a module, and such module is combined with a processor, a storage device, a communication device, a power supply device, and the like to be made into a product as an electronic apparatus such as a smartphone or a personal computer.

Figure 14:
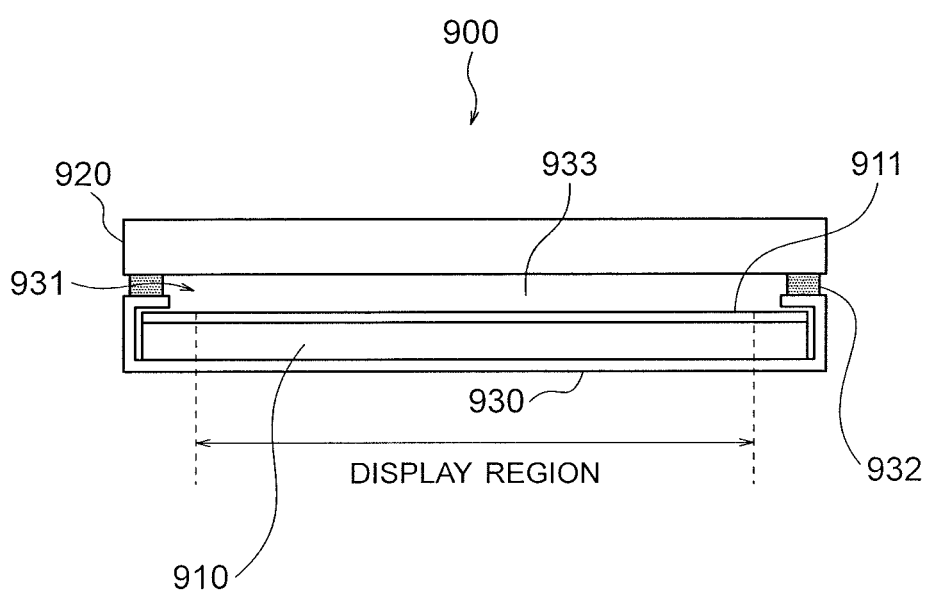
FIG. 14 is an explanatory chart showing a sectional-view structure of the display device shown in FIG. 13.

FIG. 14 is an explanatory chart showing a sectional-view structure of the display device 900 shown in FIG. 13. The visual sense display unit 910 is fabricated by being housed in a chassis 930 which has an aperture for exposing the entire display region of a screen and by attaching the tactual sense presenting unit 920 from the above the aperture by an adhesive 932 (or an adhesive tape or the like). At that time, the tactual sense presenting unit 920 and the chassis 930 are laminated in the outer fringe of the aperture 931. That is, a gap 933 is formed between the visual sense display unit 910 and the tactual sense presenting unit 920.

Figure 15:
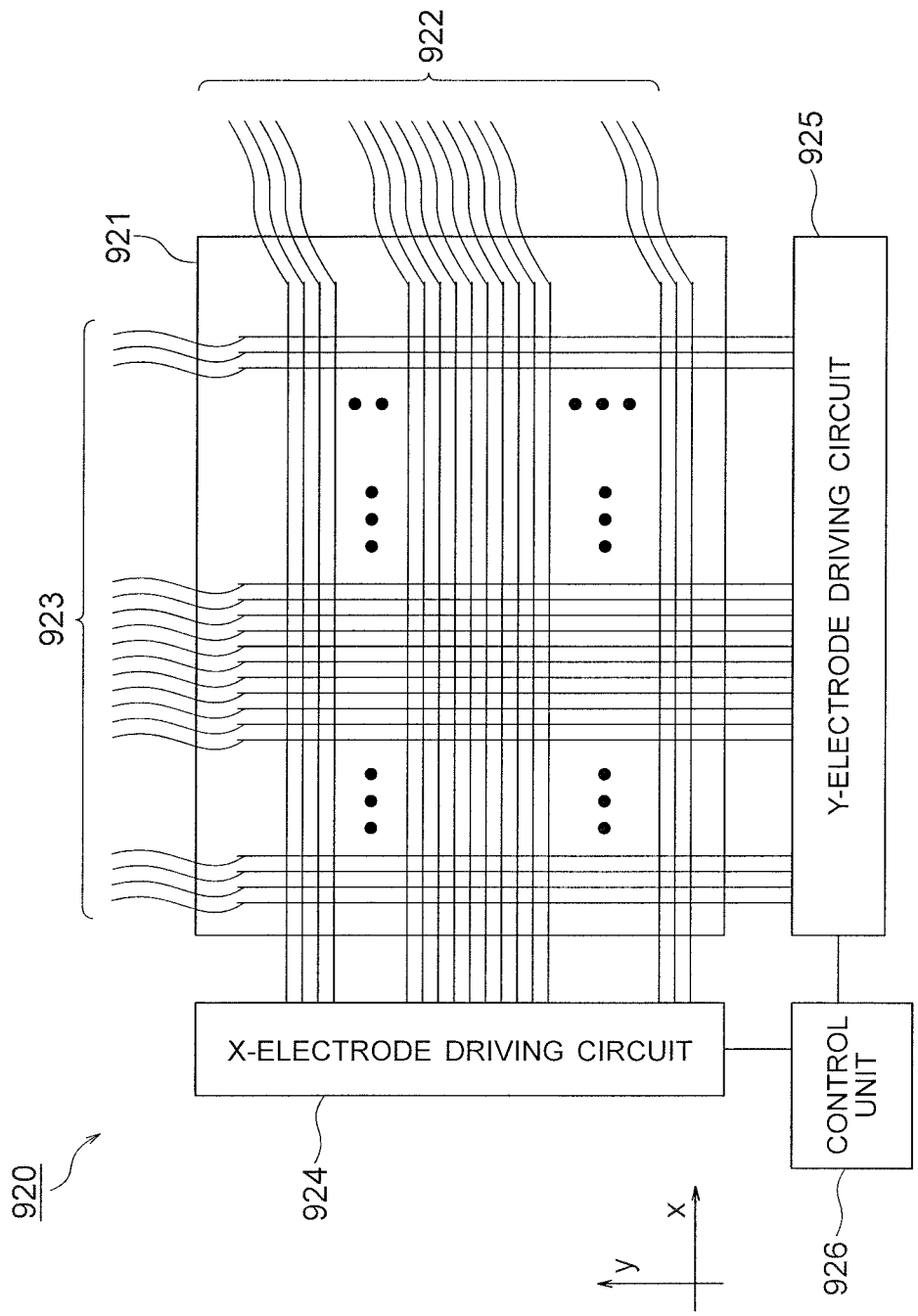
FIG. 15 is an explanatory chart showing a plane view of the structure of the tactual sense presenting unit shown in FIG. 13 and FIG. 14.

FIG. 15 is an explanatory chart showing a plane view of the structure of the tactual sense presenting unit 920 shown in FIG. 13 and FIG. 14. The tactual sense presenting unit 920 is constituted with a plurality of X-electrodes 922 extended in the x-direction on a flat supporting substrate 921; a plurality of Y-electrodes 923 extended in the y-direction that is orthogonal to the X-electrodes 922 on the supporting substrate 921; an X-electrode driving circuit 924 connected to each of the X-electrodes 922; a Y-electrode driving circuit 925 connected to each of the Y-electrodes 923; and a control unit 926 connected to each of the X-electrode driving circuit 924 and the Y-electrode driving circuit 925. The X-electrodes 922 and the Y-electrodes 923 are formed with a conductive material exhibiting transparency for visible light rays, such as ITO (Indium Tin Oxide).

An insulating film keeps electrical insulation between the X-electrodes 922 and the Y-electrodes 923 and between the X-electrodes 922 as well as the Y-electrodes 923 and fingers of the user touching them from the above. The control unit 926 controls the X-electrode driving circuit 924 and the Y-electrode driving circuit 925 based on information regarding a target region to present a tactual sense, which is given by a processor (not shown) which supervises actions of the entire electronic apparatus.

The X-electrode driving circuit 924 and the Y-electrode driving circuit 925 apply voltage signals of required frequencies to the electrodes in the required range out of the X-electrodes 922 and the Y-electrodes 923 according to the control information inputted from the control unit 926.

Thereby, the tactual sense presenting unit 920 can generate an electric field of a required frequency for a specific target region (may be a single section or a plurality of sections) out of the regions where the X-electrodes 922 and the Y-electrodes 923 are disposed and present a sense of texture to that region by changing a friction force between the finger and the touched surface by an electrostatic force worked between the user and the electrodes when the user traces the surface of the target region with the finger.

Figure 16:
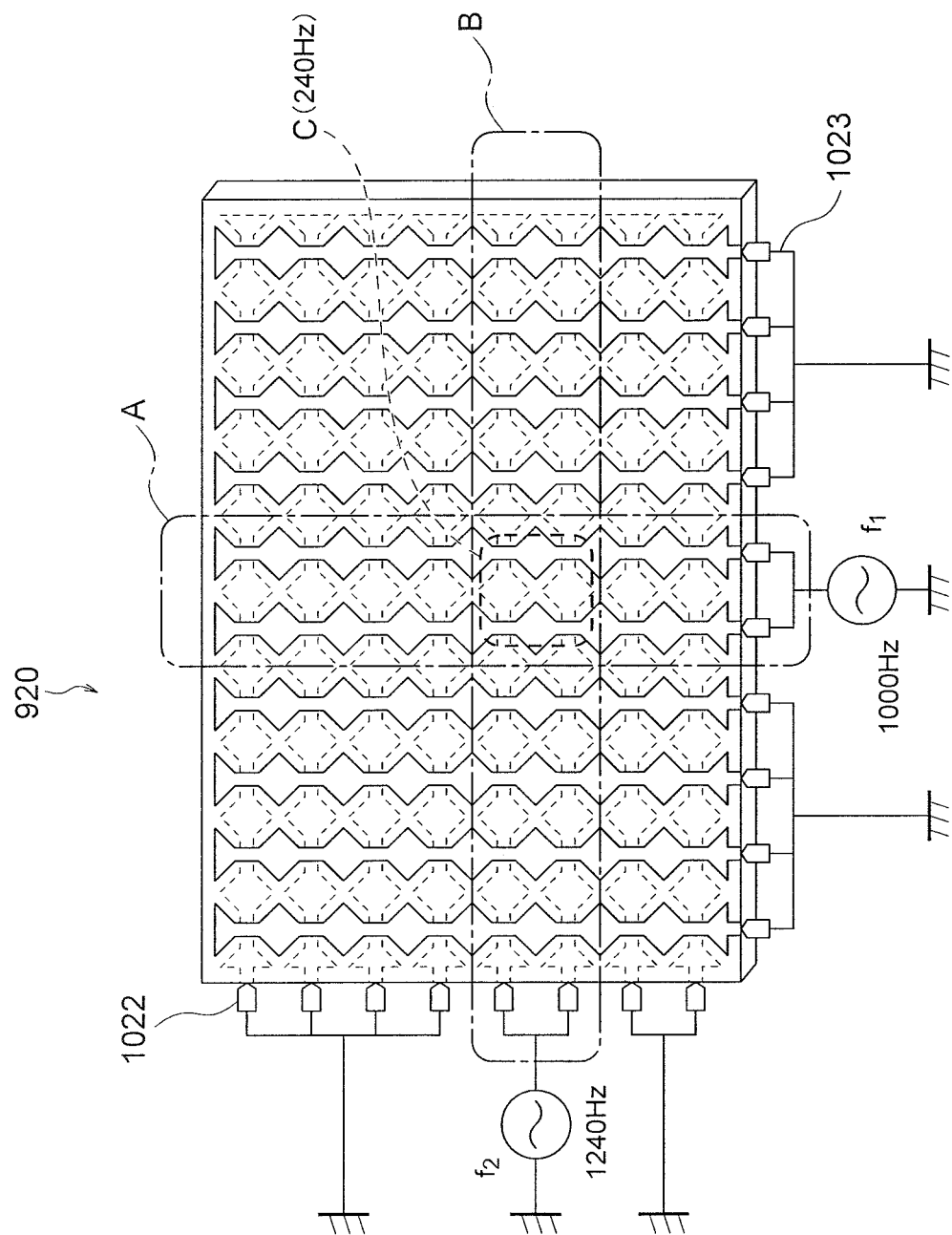
FIG. 16 is an explanatory chart regarding sounding that is found to be generated as a result of creating the display device shown in FIGS. 13 to 15 experimentally.

FIG. 16 is an explanatory chart regarding sounding that is found to be generated as a result of experimentally creating the display device 900 shown in FIGS. 13 to 15. In the example shown herein, a voltage signal of a frequency $f_1=1000$ Hz is applied to the those within a range of a target region C among the Y-electrodes 923 and a voltage signal of a frequency $f_2=1240$ Hz is applied to those within the range of the target region C among the X-electrodes 922 in order to give a sense of texture to the target region C. The other X-electrodes 1022 and the Y-electrodes 1023 are earthed. When the user touches the device surface in that state, an electrostatic force of 240 Hz is generated in the target region C between the user and the electrodes.

Thereby, it was confirmed that a sense of texture that can be perceived by human beings through the skin sensation only in the target region C can be presented while no specific tactual sense is perceived in the other regions.

However, it was also found that sounding occurred when the surface of the tactual sense presenting unit 920 (of the display device 900) is traced by a finger to find the target region C with the finger.

Referring to FIG. 14 and FIG. 16 for describing the sounding, it is so described that the sounding is generated when the finger is slid on the target region C. Further, the sounding also occurs when the finger is slid on a region B that is the region where a voltage signal of frequency $f_2=1240$ Hz is applied only to the X-electrodes 1022 and when the finger is slid on a region A that is the region where a voltage signal of frequency $f_1=1000$ Hz is applied only to the Y-electrodes 1023.

In the meantime, when the user does not execute an action of sliding the finger and sets still the finger on the touch surface, the sounding does not occur. Further, the sounding does not occur when the user is not touching the device. Based on the results described above, it is considered that the sounding occurs due to a mutual effect of the user and the tactual sense presenting unit. As a mechanism of the sounding, a following process model can be considered.

(1) When a signal voltage is applied to the electrodes, an electrostatic force works between the electrodes and the finger of the user. The electrostatic force fluctuates according to the frequency of the signal voltage.

(2) The normal force working between the finger of the user and the touch surface fluctuates according to the fluctuation of the electrostatic force, so that the friction force fluctuates according to the frequency of the signal voltage when the user slides the finger.

(3) The fluctuation in the friction force causes fluctuation of a force working in the shearing direction of the finger, and causes deformation of the finger according to the frequency of the signal voltage. This deformation becomes the origin of mechanical oscillation.

(4) The deformation of the finger is transmitted to the tactual sense presenting panel on the surface of the display device 900, and flexure according to the frequency of the signal voltage is generated in the tactual sense presenting panel.

(5) The area of the tactual sense presenting panel is large. Thus, the flexure (oscillation) is radiated efficiently into the air as a sound or resonated and amplified in the gap 933 to be perceived by the user as the sounding.

As described, it is considered that the sounding occurs when the tactual sense presenting unit having a large area is sagged or resonated due to a mutual effect with the user caused by the actions of the tactual sense presenting unit 920. The deformation (oscillation) of the finger caused by the frequency $f_1=1000$ Hz and the frequency $f_2=1240$ Hz to be applied and the deformation (oscillation) of the finger of 240 Hz generated in the target region C by a beat of those themselves do not generate a sound of such volume that can be heard by the ears of human beings. However, the tactual sense presenting panel is sagged by that, so that the sound wave transmitted in the air is increased or amplified by resonance in the gap 933 to be the sounding that can be heard by the ears of the human beings.

The sounding is in a level that is not so much annoying in places where the surrounding noise is larger than a value of some extent (about 60 to 70 dB as a general standard) such as at exhibition halls and the like, while it is annoying in places where the silence is maintained (about 50 dB) such as offices and the like.

Further, in the example shown in FIG. 16, the frequency of the electrostatic force generated by the beat is 240 Hz. It is experimentally confirmed by the inventors, et al. of the present invention that the human beings can perceive a sense of texture through the skin sensation at the frequency larger than 10 Hz and less than 1000 Hz and that the sense of texture can be perceived most strongly especially at the frequency near 200 Hz. However, this frequency range is included in a typical audible range. As long as there is such an intention of presenting a sense of texture to the skin of the human beings, the frequency cannot be changed.

In the meantime, when the visual sense display unit 910 is housed into the chassis 930 as shown in FIGS. 13 and 14 to form a module, the level of sounding becomes larger. However, it is inevitable to make them into a module for mounting the display device 900 to the electronic apparatus into a product. Further, even if a chassis is not used in a stage of forming a module, it is still inevitable for the display unit to be housed inside some kind of exterior casing at a stage before being made into a final product.

Such issue described above is essentially an inevitable issue in the display device in a structure in which the tactual sense presenting unit 920 is attached to the visual sense display unit 910 for allowing the finger of the user to perceive a tactual sense by an electrostatic force. It is not essential to completely eliminate generation of sounding. However, it is necessary to suppress the sounding to a level with which "the product can be used in offices and the like without any specific unpleasant feeling".

First Exemplary Embodiment

The structures of the first exemplary embodiment of the present invention will be described by referring to accompanying drawings FIGS. 1 to 3.

A display device 100 according to the first exemplary embodiment is a display device which includes: a plate-type visual sense display unit 10 which displays a screen by image signals supplied from outside; and a plate-type tactual sense presenting unit 20 which is disposed by opposing to the visual sense display unit 10 and presents a tactual sense that can be perceived by a user on the screen. Note here that the tactual sense presenting unit 20 includes electrodes (X-electrodes 22, Y-electrodes 23) and an insulating film that covers the electrodes, and it is structured to present a tactual sense to the user by generating an electrostatic force between the electrodes and the user by voltage signals supplied to the electrodes from outside. The display device 100 is constituted by filling a resin 40 that exhibits transparency for visible light rays in the gap between the visual sense display unit 10 and the tactual sense presenting unit 20. Further, a touch coordinate detection unit 11 for detecting a content of a touch operation done by the user on the operation screen is provided to the visual sense display unit 10.

Further, the tactual sense presenting unit 20 includes: a supporting substrate 21; a plurality of mutually parallel X-electrodes 22 extended along a first direction on the supporting substrate; a plurality of mutually parallel Y-electrodes 23 which are extended along a second direction on the supporting substrate by being insulated from and orthogonal to the X-electrodes mutually; and driving circuits (X-electrode driving circuit 24, Y-electrode driving circuit 25) which apply a voltage signal of a first frequency to the X-electrodes corresponding to information of a target region inputted from outside among each of the X-electrodes, apply a voltage signal of a second frequency to the Y-electrodes corresponding to information of a target region inputted from outside among each of the Y-electrodes, and generate electrical beat oscillation in the target region by an absolute value of a difference between the first and second frequencies. Note here that the first and second frequencies are both 500 Hz or larger, and there is a period where the absolute value of the difference between the first and second frequencies is larger than 10 Hz and less than 1000 Hz.

Further, the tactual sense presenting unit 20 has a tactual sense presenting function which generates an electrostatic force that can be perceived by the user by input of a voltage signal at a position corresponding to a displayed object that is displayed on the operation screen. In the meantime, the resin 40 covers the entire display region of the visual sense display unit in a layer-shaped gap between the visual sense display unit 10 and the tactual sense presenting unit 20. Further, the display device 100 includes a chassis 30 which houses the visual sense display unit 10 while having an aperture 31 for exposing the entire display region, and the resin 40 fills between the visual sense display nit 10 and the tactual sense presenting unit 20 while covering the entire aperture 31. Further, the display device 100 is structured by coupling the visual sense display unit 10 and a supporting structural body (casing 50) which supports the visual sense display unit via non-elastic bodies (screws 51). Note here that the resin 40 may be an active energy type curable resin, a thermosetting resin, a moisture curable resin, or a composite type curable resin that is a composite of those.

With the above-described structures, the display device 100 becomes capable of presenting a sense of texture effectively to the skin of the human beings while suppressing generation of unpleasant noises.

Hereinafter, this will be described in more details.

Figure 1:
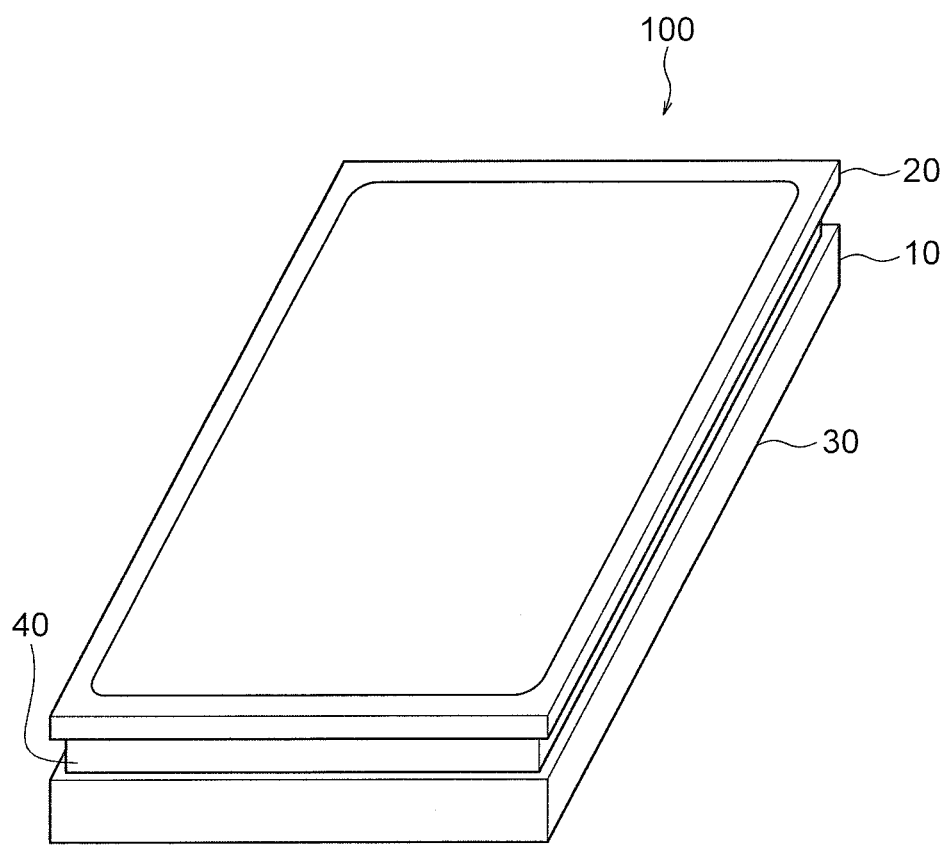
FIG. 1 is an explanatory chart showing structures of a display device according to a first exemplary embodiment of the present invention.

FIG. 1 is a perspective view showing the structures of the display device 100 according to the first exemplary embodiment of the present invention. The display device 100 is structured by stacking the visual sense display unit 10 and the tactual sense presenting unit 20.

The display device 100 is what is called a module, housed in the chassis 30, and such module is combined with a processor, a storage device, a communication device, a power supply device, and the like to be made into a product as an electronic apparatus such as a smartphone or a personal computer. Further, through providing an optical touch panel to the frame part of the display device 100 or through providing an optical sensor array (touch coordinate detection unit 11) to the visual sense display unit 10, it is possible to constitute a touch-panel display device which enables the user to perform touch operation input.

Figure 2A:
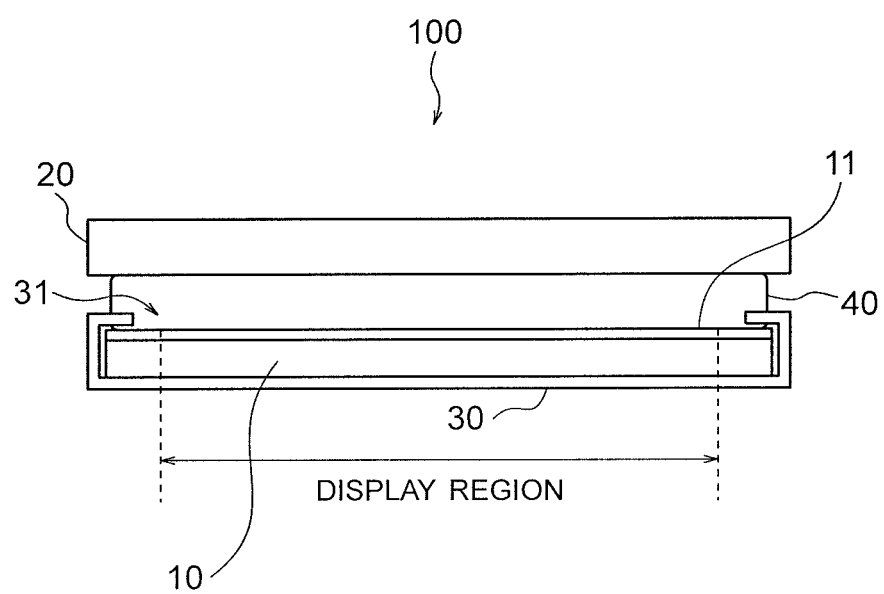
FIG. 2A is an explanatory chart showing a sectional view of a state where a visual sense display unit and a tactual sense presenting unit shown in FIG. 1 are stacked.
Figure 2B:
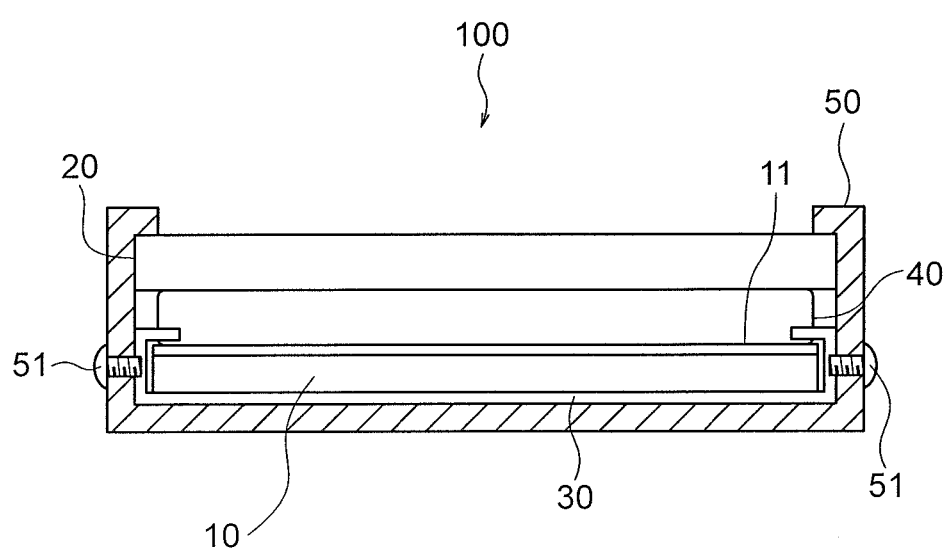
FIG. 2B is an explanatory chart showing a sectional view of a state where the stacked visual sense display unit and the tactual sense presenting unit shown in FIG. 2A are further attached to a casing.
Figure 2D:
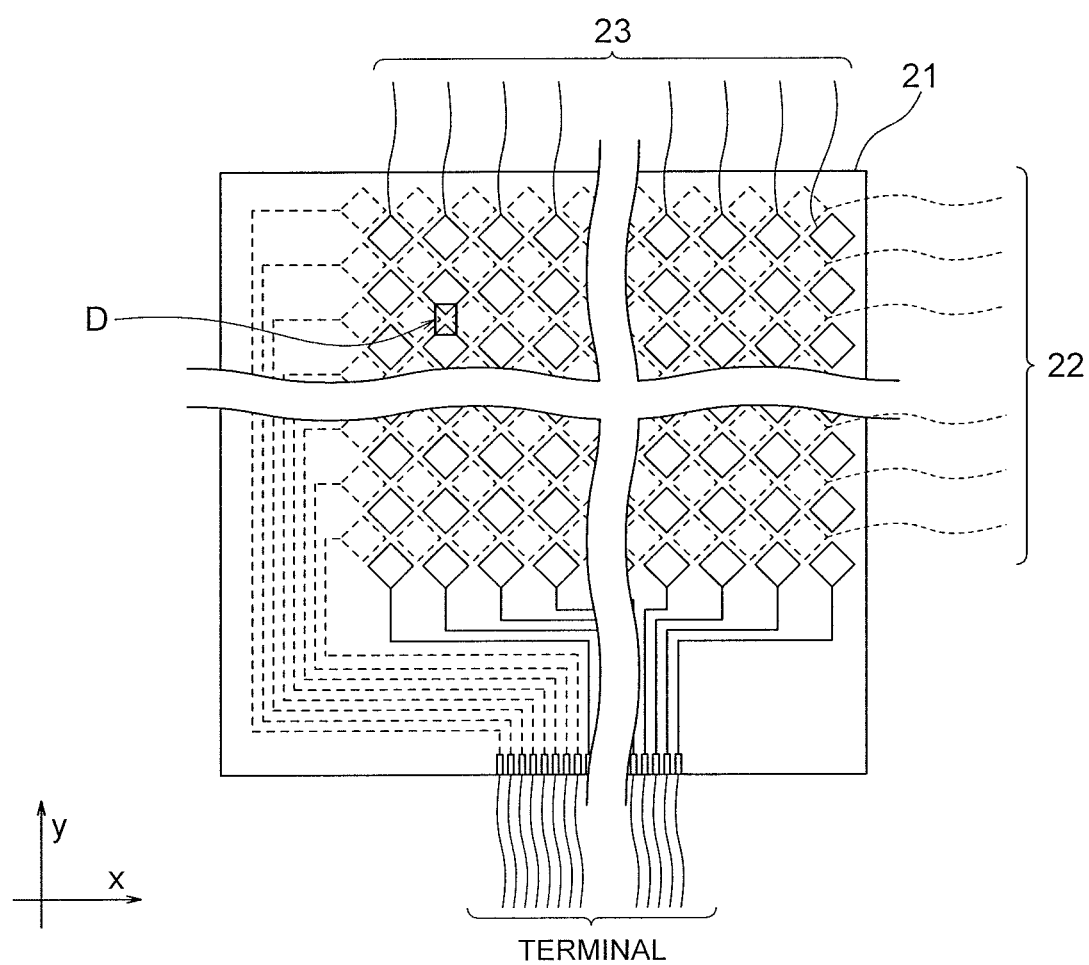
FIG. 2D is an explanatory chart showing more detailed plane shapes of a supporting substrate, X-electrodes, and Y-electrodes shown in FIG. 2A.

FIG. 2 provides explanatory charts showing sectional-view structures of the display device 100 shown in FIG. 1. Among those, FIG. 2A shows a sectional view of a state where the visual sense display unit 10 and the tactual sense presenting unit 20 are stacked. FIG. 2B shows a state where the stacked units are further attached to the casing 50. FIG. 2C shows the results of the experiments done by the inventors, et al. of the present invention regarding the elasticity modulus of the resin 40. Further, FIG. 2D shows a more detailed plane shape of the tactual sense presenting unit 20, and FIG. 2E shows a sectional-view shape thereof.

In FIG. 2A, the visual sense display unit 10 is housed in the chassis 30 having the aperture 31 for exposing the entire display region, and the resin 40 exhibiting transparency for the visible light rays is filled between the visual sense display unit 10 and the tactual sense presenting unit 20 in the aperture 31. In FIG. 2B, it is housed in the casing 50, and the casing 50 and the chassis 30 are fixed via the screws 51 that are screwed through those from the side faces. The screw 51 is of a non-elastic material, and it is typically a metal. As a means for fixing the casing 50 and the chassis 30, any non-elastic bodies other than the screws 51 may be used.

More specifically, the resin 40 is what is called an optical adhesive (Optical Clear Resin: OCR) which exhibits transparency for visible light rays. This resin has a characteristic of being solidified by irradiation of ultraviolet rays. In the case of the exemplary embodiment, the elasticity modulus (Young's modulus) in a state of being solidified is about 40 kPa. Further, the thickness of the layer of the resin 40 is 0.8 mm.

The inventors, et al. of the present invention experimentally created a display device by using various kinds of OCR with different values of the elasticity modulus and found that display unevenness was generated in the liquid crystal display as the visual sense display unit when the modulus of elasticity exceeded 100 kPa. The result of experiment executed to check the relation between the elasticity modulus of OCR and the display unevenness is shown in FIG. 2C. It is found from the result thereof that it is desirable for the elasticity modulus of OCR to be less than 100 kPa. Further, it is also found from the experiment that it is desirable to set the thickness of the resin 40 to be thicker than 0.2 mm in view of overcoming the issue of display unevenness.

The structures of the tactual sense presenting unit 20 will be described in more details. FIG. 2D shows more detailed plane shapes of the supporting substrate 21, the X-electrodes 22, and the Y-electrodes 23 of the tactual sense presenting unit 20 shown in FIG. 2A. The X-electrodes 22 and the wirings thereof are shown with dotted lines, and the Y-electrodes 23 and the wirings thereof are shown with solid lines.

The X-electrode 22 is in a form in which a plurality of diamond-shaped electrodes are connected in a row via connection parts. That is, a single X-electrode 22 is formed by electrically connecting diamond-shaped electrodes neighboring to each other on the left and right sides via the connection parts and extended in the x-direction. The X-electrodes 22 are disposed in the y-axis direction at space of 2 mm provided therebetween. That is, the pitch between the X-electrodes is 2 mm. Similarly, the Y-electrode 23 is in a form in which a plurality of diamond-shaped electrodes are connected in a row via connection parts. That is, a single Y-electrode 23 is formed by electrically connecting diamond-shaped electrodes neighboring to each other on the top and bottom sides via the connection parts and extended in the y-direction. The Y-electrodes 23 are disposed in the x-axis direction at space of 2 mm provided therebetween. That is, the pitch between the Y-electrodes is 2 mm.

In a plane view, the X-electrodes 22 and the Y-electrodes 23 are formed in such a manner that the connection parts of the diamond-shaped electrodes overlap with each other via an insulating film and that the main part of the diamond of the X-electrode 22 and the main part of the diamond of the Y-electrode 23 do not overlap with each other. That is, in a plane view, the main part of the diamond of the X-electrode and the main part of the diamond of the Y-electrode are formed to be neighboring to each other.

FIG. 2E shows an enlarged view of the structure of the mutual connection part between the X-electrode 22 and the Y-electrode 23 shown in FIG. 2D. The upper side of FIG. 2E is a plane view showing the mutual connection part between the electrodes shown as a block D in FIG. 2D, and the lower side of FIG. 2E is a sectional view taken along A-A' line of the upper side of FIG. 2E.

The X-electrode 22 is formed by mutually connecting diamond-shaped electrodes on a straight line form by a bridge electrode 27. Further, the Y-electrode 23 is also formed by mutually connecting diamond-shaped electrodes on a straight line form by a connection part 28 that is formed by using a same material as that of the diamond-shaped electrodes. The bridge electrode 27 and the connection part 28 are insulated from each other by an insulating film 29.

Referring to the lower side of FIG. 2E, the sectional-shape structure of the connection part between the X-electrode 22 and the Y-electrode 23 as well as the manufacturing procedure thereof will be described. On the supporting substrate 21 that is a glass substrate, the bridge electrode 27 is formed first by using a transparent conductive film such as ITO.

Then, the insulating film 29 is formed on the bridge electrode 27 by using an organic material. Through forming it with the organic material, the film thickness of the insulating film 29 can be easily thickened and the originally unnecessary coupled capacitance formed in the intersection parts between the X-electrodes 22 and the Y-electrodes 23 can be reduced. The insulating film 29 is formed to cover the bridge electrode so as to insulate the connection part between the bridge electrode 27 and the Y-electrode 23 and not to cover the bridge electrode so that the bridge electrode 27 and the diamond of the X-electrode 22 come to be in contact with each other.

Then, the X-electrodes 22, the Y-electrodes 23, the connecting parts 28, other wirings and terminals are formed collectively by using a transparent conductive film. At last, the insulating film 29 is deposited by using the organic material, and contact holes are formed in the terminals. A plurality of terminals formed on the supporting substrate 21 are connected to the X-electrodes 22 or the Y-electrodes 23, and those are connected to the X-electrode driving circuit 24 and the Y-electrode driving circuit 25.

FIG. 3A is an explanatory chart showing the plane-view structures of the tactual sense presenting unit 20 shown in FIG. 1 and FIG. 2. The tactual sense presenting unit 20 is constituted with: a plurality of X-electrodes 22 extended along the x-direction on the flat supporting substrate 21; a plurality of Y-electrodes 23 extended along the y-direction that is orthogonal to the X-electrodes 22 on the supporting substrate 21; the X-electrode driving circuit 24 connected to each of the X-electrodes 22; the Y-electrode driving circuit 25 connected to each of the Y-electrode 23; and a control unit 26 connected to each of the X-electrode driving circuit 24 and the Y-electrode driving circuit 25. The X-electrodes 22 and the Y-electrodes 23 are formed with a metal material exhibiting transparency for visible light rays, such as ITO (Indium Tin Oxide).

The X-electrode 22 and the Y-electrode 23 intersect with each other at the intersection part thereof via the insulating film so that electrical insulation between the both can be maintained. Further, the insulating film is also formed on the X-electrodes 22 and the Y-electrodes 23 to electrically insulate between the finger and the X-electrodes 22 and between the finger and the Y-electrodes 23 when the user touches the surface of the tactual sense presenting unit 20 from the above with the finger.

The control unit 26 controls the X-electrode driving circuit 24 and the Y-electrode driving circuit 25 based on information regarding the target region to present a tactual sense, which is given by a processor (not shown) which supervises actions of the entire electronic apparatus including the display device 100. The X-electrode driving circuit 24 and the Y-electrode driving circuit 25 apply voltage signals of required frequencies to the electrodes in the required range out of the X-electrodes 22 or the Y-electrodes 23 according to the control information inputted from the control unit 26.

Figure 3B:
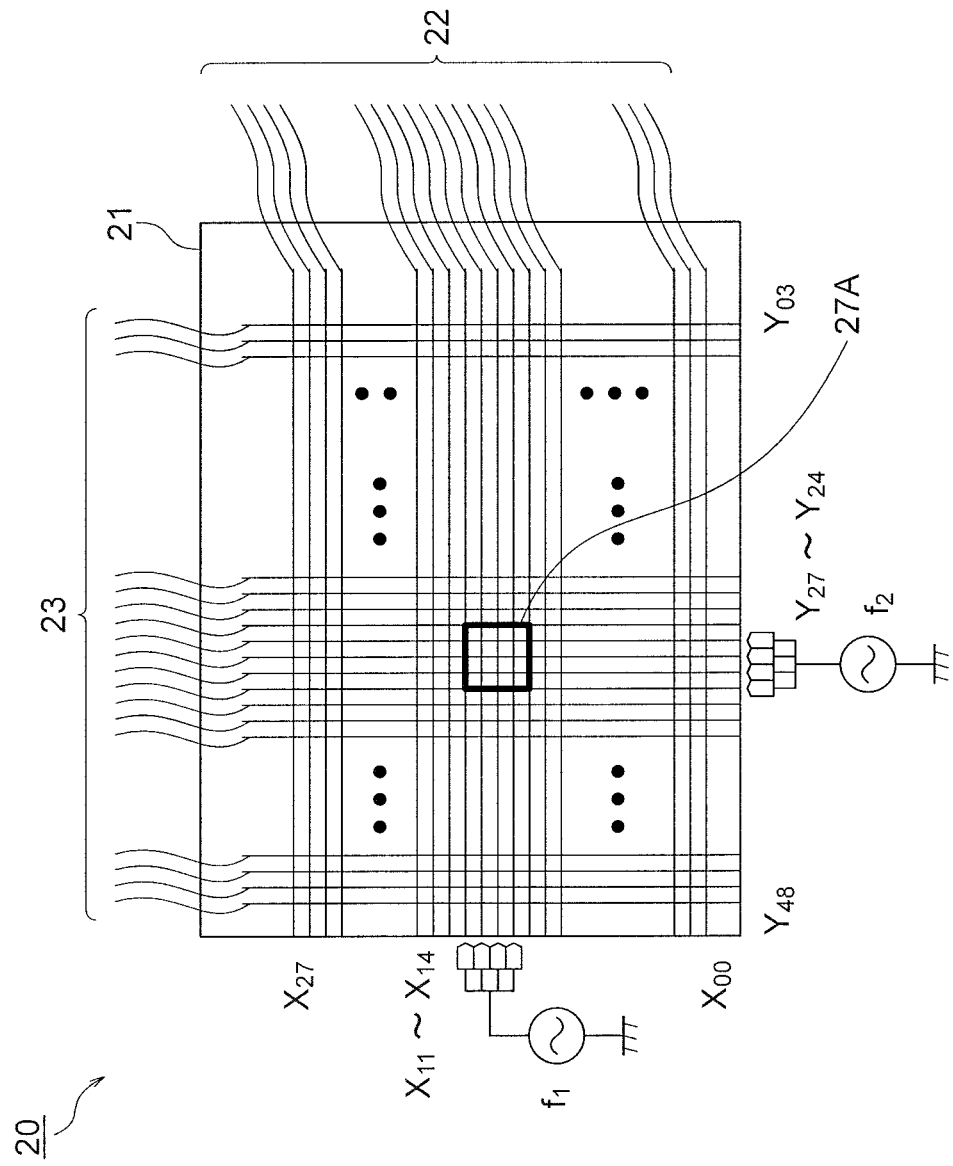
FIG. 3B is an explanatory chart showing a driving method of the tactual sense presenting unit shown in FIG. 3A.

FIG. 3B is an explanatory chart showing a driving method of the tactual sense presenting unit 20 shown in FIG. 3A. Note here that each of the X-electrodes 22 and the Y-electrodes 23 is discriminated through applying different reference symbols for each of the electrodes. That is, in the case shown in FIG. 3B, twenty-eight X-electrodes 22 and forty-six Y-electrodes 23 are formed on the supporting substrate 21, and each of the X-electrodes 22 is referred to as X00 to X27 from the bottom towards the upper direction while each of the Y-electrodes 23 is referred to as Y03 to Y48 from the right towards the left direction.

Further, the region where a sense of texture is to be presented is referred to as a target region 27A. The target region 27A is a range of X11 to X14 of the X-electrodes 22 and in a range of Y24 to Y27 of the Y-electrodes 23. The control unit 26 gives a control signal to the X-electrode driving circuit 24 and the Y-electrode driving circuit 25 based on the information of the target region 27A given from outside.

Upon receiving the control signal, the X-electrode driving circuit 24 applies a voltage signal of a frequency f1=1000 Hz to X11 to X14, and the Y-electrode driving circuit 25 applies a voltage signal of a frequency f2=1240 Hz to Y24 to Y27. Note here that the X-electrode driving circuit 24 and the Y-electrode driving circuit 25 ground the X-electrodes 22 and the Y-electrodes 23 not corresponding to those in the case shown in FIG. 3B in order to prevent the voltage from being induced by capacitance coupling of the electrodes. Further, instead of grounding, a direct current voltage of a voltage signal of a frequency of 2240 Hz or higher may be applied (the reason for that will be described later).

When the signals described above are applied to the X-electrodes 22 and the Y-electrodes 23 and the surface of the tactual sense presenting unit 20 is traced by a finger, a sense of texture is perceived only in the target region 27A where X11 to X14 and Y24 to Y27 intersect with each other. Through selecting the electrodes to apply the voltage signals arbitrarily, a sense of texture can be presented in an arbitrary prescribed region. Further, through selecting all the X-electrodes and all the Y-electrodes, it is also possible to present a sense of texture in the entire region that includes all the intersection parts between the X-electrodes and the Y-electrodes.

The inventors, et al. of the present invention have verified by experiments that a sense of texture is not presented in the region excluding the target region 27A from the region on the electrodes of X11 to X14 and also in the region excluding the target region 27A from the region on the electrodes of Y24 to Y27. That is, the inventors, et al. of the present invention have verified that fingers of human beings do not perceive a sense of texture when the frequency of the voltage signals applied to the electrodes is 1000 Hz or 1240 Hz.

In the meantime, in the target region 27A, the X-electrodes to which the voltage signal of f1=1000 Hz is applied and the Y-electrodes to which the voltage signal of f2=1240 Hz is applied are neighboring to each other. Thus, a beat known in the field of wave motions is generated. Hereinafter, a mechanism of presenting a sense of texture due to a beat will be described.

Figure 3C:
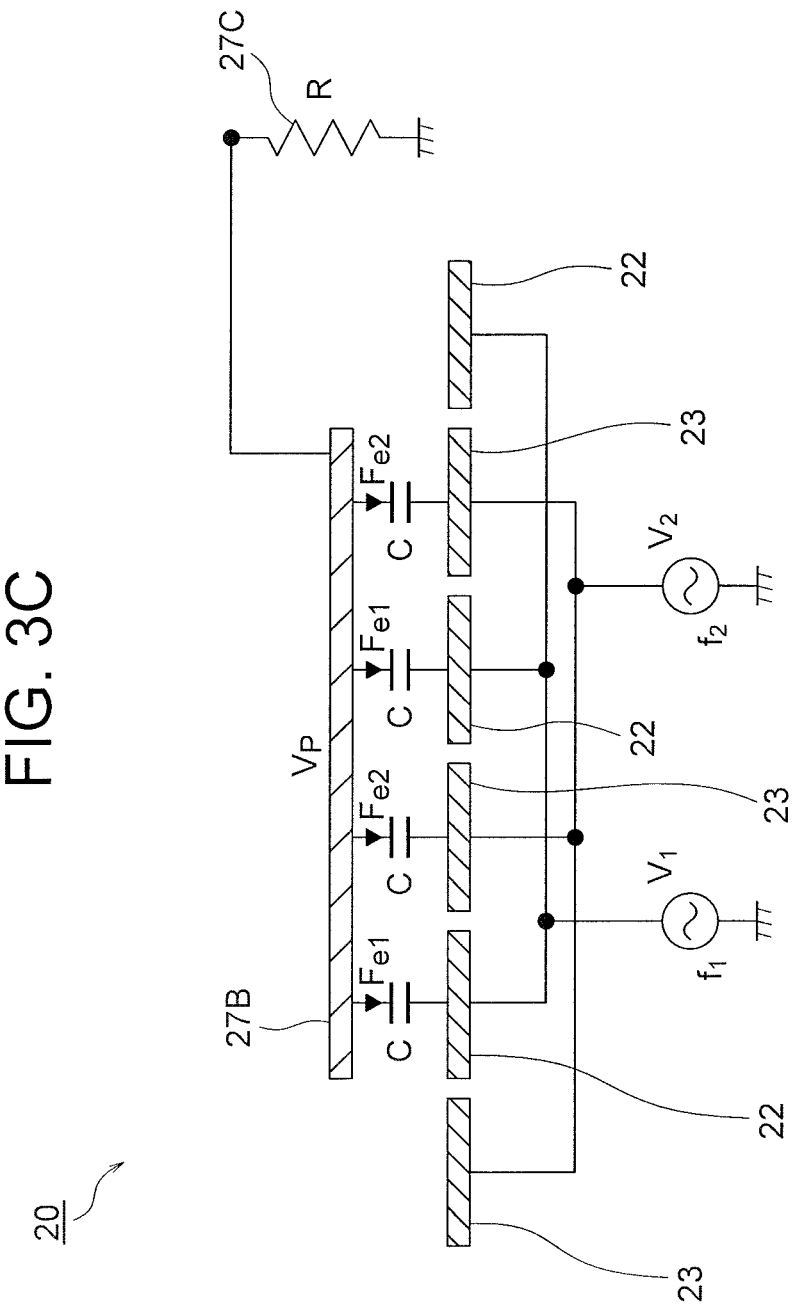
FIG. 3C is an explanatory chart showing a sectional-view model of the tactual sense presenting unit shown in FIG. 3A.

FIG. 3C is an explanatory chart showing a sectional view model of the tactual sense presenting unit 20 shown in FIG. 3A and FIG. 3B. As described above, a plurality of X-electrodes 22 and a plurality of Y-electrodes 23 are disposed to be neighboring to each other on the flat supporting substrate 21 (not shown in FIG. 3C). Note here that a single electrode 27B as a model of a finger is disposed at a position opposing to the two X-electrodes 22 and two Y-electrodes 23 disposed within the target region 27A out of the X-electrodes 22 and the Y-electrodes 23. Human bodies exhibit a grounding effect, so that the electrode 27B can be formed as a model that is grounded via a resistance 27C having a resistance value R.

Now, a voltage signal V1 expressed by $V1 = A \cos(2\pi f1 t)$ is applied to the X-electrodes 22 within the target region 27A. The amplitude of the voltage signal V1 is A, the frequency is f1, and t shows time. Further, a voltage signal V2 expressed by $V2 = A \cos(2\pi f2 t)$ is applied to the Y-electrodes 23 within the target region 27A. The amplitude of the voltage signal V2 is A that is equivalent to the amplitude of the voltage signal V1, and the frequency is f2.

A section between the electrode 27B and each of the X-electrodes 22 within the target region 27A can be formed as a model as a parallel flat plate capacitor having a static capacitance C, and a section between the electrode 27B and each of the Y-electrodes 23 within the target region 27A can be formed as a model as a parallel flat plate capacitor having a static capacitance C.

At this time, a voltage VP generated in the electrode 27B becomes VP=(V1+V2)/2 when the resistance value R is sufficiently high.

As shown in FIG. 3A, the electrostatic force worked between a single X-electrode 22 and the electrode 27B that is a model of a finger is expressed as Fe1. Fe1 can be acquired as follows by using a formula known as a working force between the electrodes on a parallel plate capacitor. Note that ε is a relative permittivity of the insulating film on the X-electrodes, and S is an electrode area of the parallel plate capacitor.

$$F_{e1} = \frac{1}{2\varepsilon S}\left(C\frac{V_2 - V_1}{2}\right)^2 \quad \text{(Expression 1)}$$

Similarly, when the electrostatic force worked between a single Y-electrode 23 and the electrode 27B that is a model of a finger is expressed as Fe2 as shown in FIG. 3A, Fe2 can be acquired as follows.

$$F_{e2} = \frac{1}{2\varepsilon S}\left(C\frac{V_1 - V_2}{2}\right)^2 \quad \text{(Expression 2)}$$

If the space between the electrodes is so minute that the electrostatic force Fe1 and the electrostatic force Fe2 cannot be discriminated with a fingertip, it is considered that the force that is the sum of each of Fe1 and Fe$_2$ works on the finger in a macroscopic manner. The total force F of all the forces working on the electrode 27B that is the model of a finger can be acquired as follows by using V1, V2, and the values of Expression 1 and Expression 2 mentioned above since F=2 (Fe1+Fe2) from FIG. 3A.

$$F = \frac{A^2 C^2}{2\varepsilon S}\{1 - \cos 2\pi(f_1 + f_2)t\}\{1 - \cos 2\pi(f_1 - f_2)t\} \quad \text{(Expression 3)}$$

From Expression 3, it can be found that the total force F of all the forces working on the modeled electrode 27B is acquired by multiplying a periodic function where the value range is [0, 2] and the frequency is the absolute value of (f1−f2) on a periodic function where the value range is [0, A2C2/(εS)] and the frequency is (f1+f2). The frequency of the envelope curve thereof is the absolute value of (f1−f2).

In this basic embodiment, the frequency f1 is 1000 Hz and the frequency f2 is 1240 Hz, so that the absolute value of the difference therebetween is 240 Hz. Thus, the attraction F working on the finger changes at 240 Hz as shown in Expression 3. Therefore, when a human being traces the surface of the tactual sense presenting unit 20 by a finger, a change of a friction force occurs at the frequency of 240 Hz. 240 Hz is the frequency at which the mechanical receptors of the skin of human beings exhibit the sensitivity, so that a sense of texture can be perceived.

Further, the inventors, et al. of the present invention have verified the presence of the perception of a sense of texture for the frequencies of the voltage signals. As a result of applying the same voltage signals to all the X-electrodes 22 and the Y-electrodes 23 on the supporting substrate 21 and checking the presence of a sense of texture, it was verified that a sense of texture was perceived in a case where the frequency of the voltage signal was larger than 5 Hz and less than 500 Hz and that a sense of texture was not perceived in a case where the frequency of the voltage signal is out of that range.

Further, the presence of the perception of a sense of texture for the absolute value of the difference between f1 and f2 was checked experimentally by applying a voltage signal of the frequency f1 to all the X-electrodes 22 on the supporting substrate 21 and applying a voltage signal of the frequency f2 on all the Y-electrodes 23. As a result, it was verified that a sense of texture was perceived in a case where the absolute value of the difference between f1 and f2 was larger than 10 Hz and less than 1000 Hz and that a sense of texture was not perceived in a case where the absolute value of the difference between f1 and f2 was 10 Hz or smaller or was 1000 Hz or larger.

Those results show that it is possible to achieve the tactual sense presenting unit 20 which presents a sense of texture to the region where the X-electrode to which the voltage signal of the frequency f1 is applied and the Y-electrode to which the voltage signal of the frequency f2 is applied intersects with each other and presents no sense of texture to other regions through setting f1 and f2 to be 500 Hz or larger and the absolute value of the difference between f1 and f2 becomes larger than 10 Hz and less than 1000 Hz provided that the frequency of the voltage signal applied to the X-electrodes is f1 and the frequency of the voltage signal to be applied to the Y-electrodes is f2.

Figure 3D:
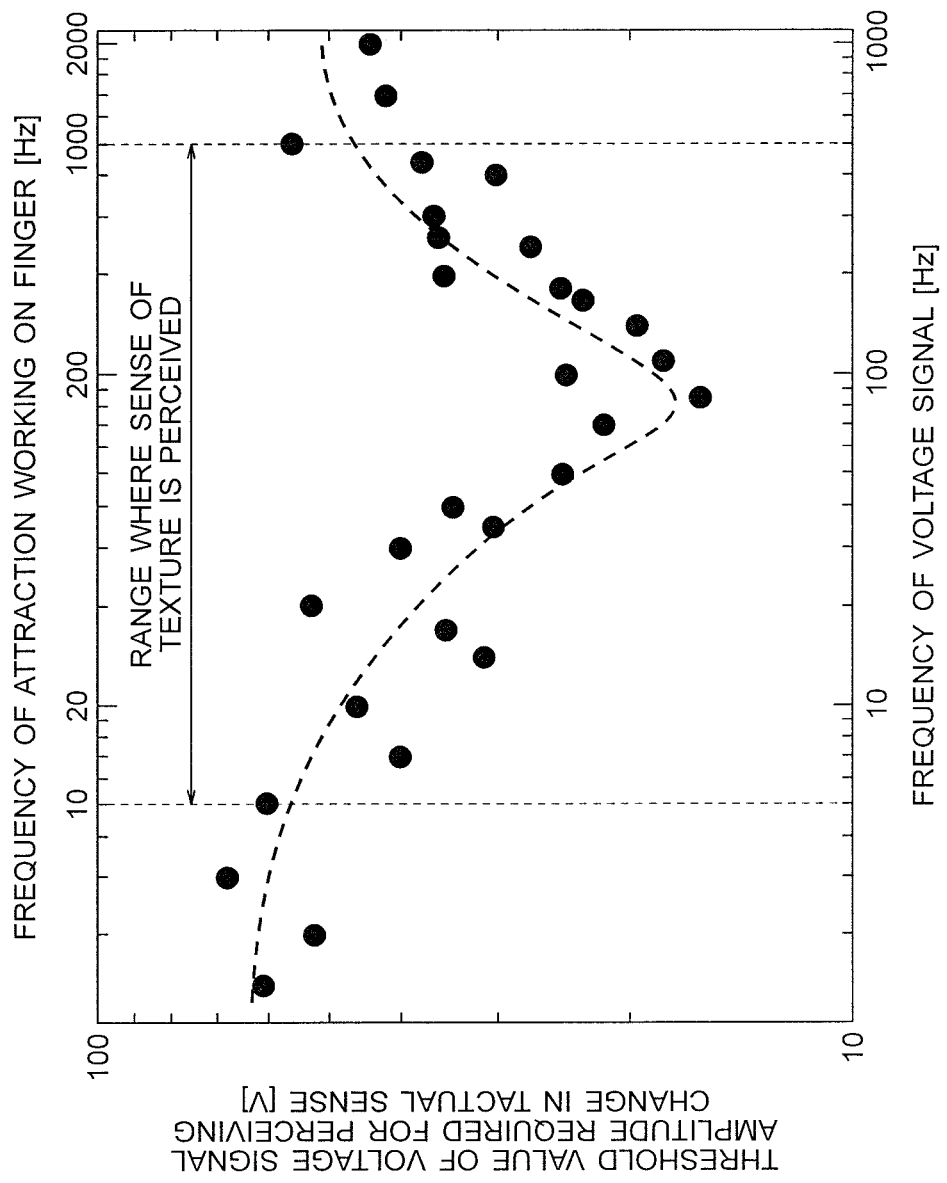
FIG. 3D is a graph of measured relations regarding the frequency of the attraction force working on a finger and the threshold values of the amplitudes of the voltage signals required for a user to perceive changes in the tactual sense with the tactual sense presenting unit shown in FIG. 3A.

Further, the inventors, et al. of the present invention performed an experiment for checking the relation between the frequency of the attraction working on the finger and the perception of the tactual sense, since it was considered that the frequency of the attraction working on the finger affects the perception of a sense of texture from Expression 3 and the facts depicted in the study thereof. FIG. 3D is a graph acquired by measuring the relation regarding the threshold value of the amplitude of the voltage signal required for the user to perceive the change in the tactual sense with respect to the frequency of the attraction working on the finger with the tactual sense presenting unit 20 shown in FIGS. 3A to 4.

The graph of FIG. 3D shows the result acquired by measuring the threshold value of the amplitude required for perceiving the change in the tactual sense by applying the same voltage signal to all the X-electrodes 22 and all the Y-electrodes 23 on the supporting substrate 21 by changing the frequency. The lower axis shows the frequency of the voltage signal applied to all the X-electrodes 22 and all the Y-electrodes 23, and the left axis shows the threshold value of the amplitude of the voltage signal required for perceiving the change in the tactual sense.

In this experiment, the frequency of the attraction working on the finger of the operator is twice as large as the frequency f1 of the applied voltage signal. In order to derive this relation, the electrostatic force F may be acquired by defining the resistance value of the resistance R49 shown in FIG. 3C as a finite value excluding infinity, i.e., extremely "0", and defining both of the frequencies of the voltage signals to be applied to the X-electrodes 22 and the Y-electrodes 23 as f1. In FIG. 3D, the frequency of the attraction working on the finger is shown on the upper axis. That is, the relation between the frequency of the attraction working on the finger and the threshold value of the amplitude required for the perception is expressed with the upper axis and the left axis of FIG. 3D.

From the graph of FIG. 3D, it can be found that the threshold value takes the minimum value when the frequency of the attraction working on the finger is near 200 Hz. That is, it is considered that the receptors of the skin of the human beings perceive a sense of texture with the highest sensitivity when the frequency of the attraction working on the finger is near 200 Hz. Further, from the graph of FIG. 3D, it can be seen not only that the frequency of the attraction working on the finger is near 200 Hz in the bottom of the valley of the graph regarding the relation between the threshold value and the frequency but that the frequencies of the beginning and end of the valley of the graph are near 10 Hz and near 1000 Hz, respectively.

That is, a sense of texture is perceived when the frequency of the attraction is within a range of 10 to 1000 Hz. A sense of texture is not perceived with the frequency out of that range, and a sense of friction is perceived.

The above actions in the experiment can be described as follows. When the voltage signal of the frequency f1 is applied to a prescribed X-electrode 22 on the supporting substrate 21 and the voltage signal of the frequency f2 different from the frequency f1 is applied to a prescribed Y-electrode 23, the attraction of the absolute value of the frequency (f1−f2) works on the finger in the target region 27A which includes the intersection between the X-electrode 22 and the Y-electrode 23.

Thus, by setting the absolute value of the frequency (f1−f2) to be larger than 10 Hz and less than 1000 Hz, a sense of texture can be presented in the target region 27A that is constituted by including the intersection between the prescribed X-electrode 22 and the prescribed Y-electrode 23.

The attraction of the frequency that is twice as large as the frequency f1 works on the finger in the region on the X-electrode excluding the target region 27A constituted by including the intersection while the attraction of the frequency that is twice as large as the frequency f2 works on the finger in the region on the Y-electrode excluding the target region 27A constituted by including the intersection based on the formula of the force working between the electrodes of the parallel plate capacitor.

Therefore, through setting both f1 and f2 to be 500 Hz or larger, the attraction of 1000 Hz or larger works on the finger both in the region on the prescribed X-electrode and in the region on the prescribed Y-electrode excluding the target region 27A constituted by including the intersection of the X-electrode and the Y-electrode. Thus, a sense of texture is not presented. Therefore, defining the target region 27A as a first region and the other region as a second region, the tactual sense presenting unit can also be structured to be able to present different tactual senses simultaneously in the first region and the second region.

The existing tactual sense presenting device requires a space for drawing a plurality of independent wirings for each of the electrodes for presenting a sense of texture. As a result, the spaces between the electrodes for presenting a sense of texture become widened, so that the spatial resolution of the tactual sense presenting device becomes low. In this regards, the tactual sense presenting unit 20 can increase the spatial resolution since the electrodes for presenting a sense of texture also function as the wirings.

Further, with this exemplary embodiment, the shapes of the electrodes are not easily recognized. Thus, even when it is used by being superimposed with the visual sense display unit 10, deterioration in the original display quality of the display device can be suppressed. Further, while the existing tactual sense presenting device faces such an issue that a sense of texture that is not required originally is presented in the regions where the wirings are drawn, the exemplary embodiment can overcome such issue.

In the example described above, there is only one target region 27A. However, this example can be easily expanded to a case where there are a plurality of target regions. That is, the numbers of the electrodes to apply the voltage signal and the frequency thereof may be determined in such a manner that the absolute value of the difference between the frequencies of the voltage signals to be applied to each of the X-electrodes and the Y-electrodes becomes within a range of 10 to 1000 Hz (desirably near 200 Hz) in each of the target regions thereof and becomes out of that range in the regions other than the target regions.

As described above, the tactual sense presenting unit 20 can present a tactual sense different from that of the other regions in arbitrary regions on the tactual sense presenting surface on the X-electrode 22 and the Y-electrode 23. The position of the region or presence of the tactual senses to be presented can be controlled as desired by the voltage signals to be applied to the X-electrode 22 and the Y-electrode 23. Further, by changing the waveforms and the amplitudes of the voltage signals, various tactual senses can be presented.

The tactual sense presenting unit 20 used in the first exemplary embodiment is constituted with the tactual sense presenting device exhibiting following characters. That is, the tactual sense presenting unit includes: the supporting substrate 21; a plurality of mutually parallel X-electrodes 22 extended along the first direction on the supporting substrate; a plurality of mutually parallel Y-electrodes 23 extended along the second direction on the supporting substrate and insulated mutually from the X-electrodes; and the driving circuit which applies a voltage signal of a first frequency to the X-electrode corresponding to the target region 27A inputted from outside out of each of the X-electrodes and applies a voltage signal of a second frequency to the Y-electrode corresponding to the target region out of each of the Y-electrodes, wherein both the first and second frequencies are 500 Hz or larger and there is a period where the absolute value of the difference between the first and second frequencies is larger than 10 Hz and less than 1000 Hz.

Thereby, the tactual sense presenting unit 20 becomes capable generating an electrostatic force that can be perceived by the user for a specific target region (may be a single section or a plurality of sections) out of the regions where the X-electrodes 22 and the Y-electrodes 23 are disposed to present a sense of texture to that region.

The structure of the tactual sense presenting unit 20 itself described above is basically the same as that of the test product described in FIG. 15. However, as described in FIGS. 2A to 2E, the exemplary embodiment employs the structure in which the resin 40 exhibiting transparency for visible light rays is filled between the visual sense display unit 10 and the tactual sense presenting unit 20.

By employing such structure, it is possible to suppress the entire panel surface of the tactual sense presenting unit from being oscillated when mechanical oscillation generated by deformation of the finger is transmitted to the large-area tactual sense presenting unit 20. Further, it is possible to eliminate the gap between the visual sense display unit 10 and the tactual sense presenting unit 20, which is a cause for generating resonance. In the meantime, a sense of texture felt when the human beings touch the target region with the finger is not weakened. That is, there is no specific problem in the function of the tactual sense presenting unit 20 for presenting a sense of texture. With the exemplary embodiment, occurrence of sounding can be suppressed to a level to be used without feeling any unpleasantness in places where the silence is maintained (about 50 dB as a standard) such as offices and the like.

Modification of First Exemplary Embodiment

Figure 3E:
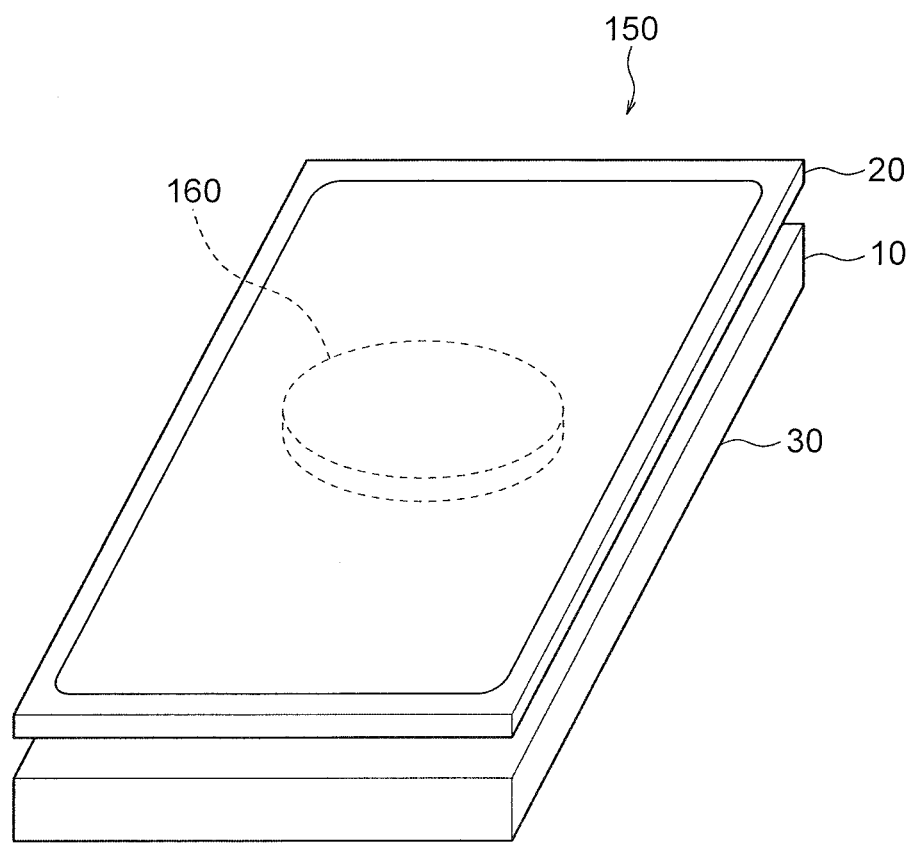
FIG. 3E is an explanatory chart showing structures of the display device according to the first exemplary embodiment of the present invention.
Figure 3F:
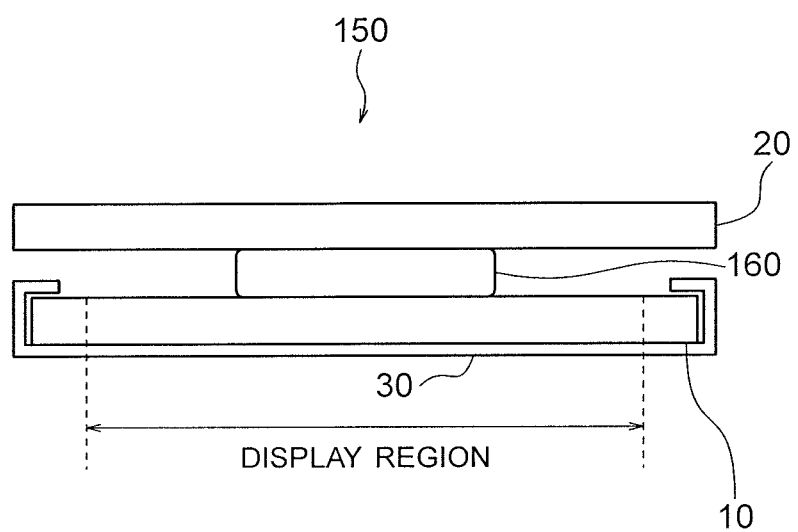
FIG. 3F is an explanatory chart showing a sectional-view structure of a display device shown in FIG. 3E.

FIG. 3E is an explanatory chart showing the structures of a display device 150 according to a modification of the first exemplary embodiment of the present invention. Further, FIG. 3F is an explanatory chart showing a sectional-view structure of the display device 150 shown in FIG. 3E.

The display device 150 has many points in common with that of the first exemplary embodiment, so that mainly the different points will be described. In the display device 100 according to the first exemplary embodiment, the resin is filled in the entire display region of the visual sense display unit. However, in the display device 150, as shown in FIGS. 3E and 3F, a resin 160 is filled only in a part of the region where the visual sense display unit 10 and the tactual sense presenting unit 20 face with each other. More specifically, the resin 160 is filled in the vicinity of the centers of each of the visual sense display unit 10 and the tactual sense presenting unit 20.

With such structure, it is also possible to suppress the oscillation generated by deformation of the finger from being discharged to the air as a sound wave through absorbing the oscillation propagated through the tactual sense presenting unit and reducing the resonance space.

Second Exemplary Embodiment

In a second exemplary embodiment of the present invention, the chassis is omitted from the structure of the first exemplary embodiment of the present invention described above. Instead, an adhesive tape 240 is constituted with a resin exhibiting transparency for visible light rays.
The same effects as those of the first exemplary embodiment of the present invention can also be acquired with this structure. Further, this structure is suited for decreasing the thickness of the apparatus by reducing the number of components. Hereinafter, this will be described in more details.

Figure 4:
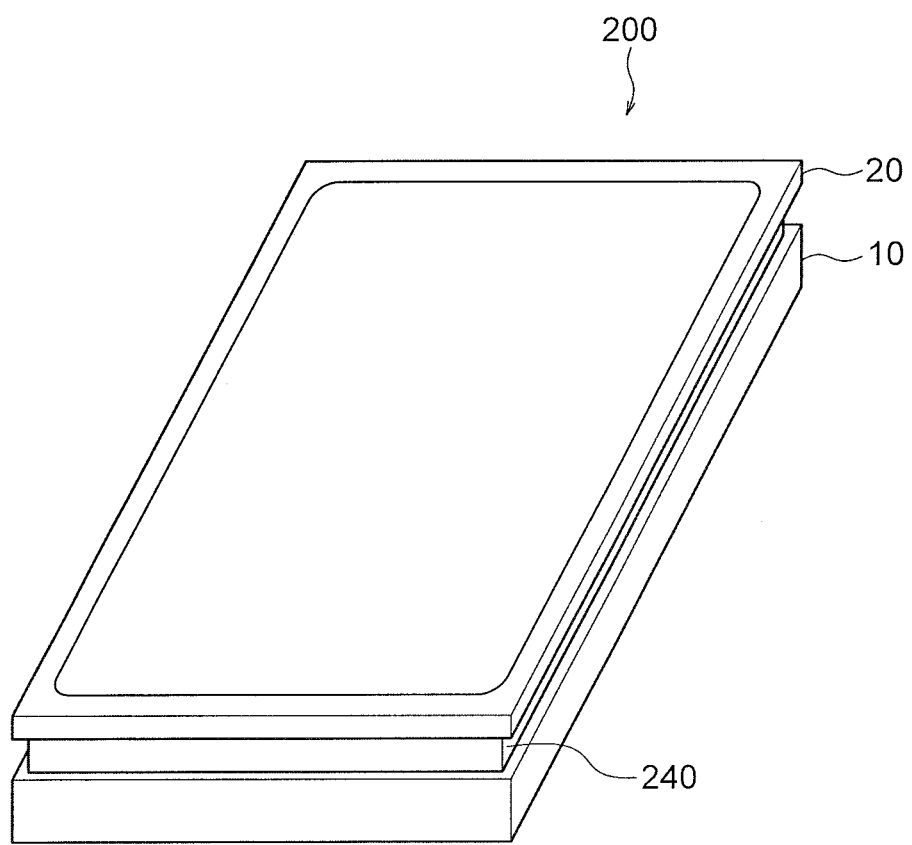
FIG. 4 is a perspective view showing structures of a display device according to a second exemplary embodiment of the present invention.

FIG. 4 is a perspective view showing the structures of a display device 200 according to the second exemplary embodiment of the present invention. The display device 200 is structured by stacking the visual sense display unit 10 and the tactual sense presenting unit 20 same as each of those of the first exemplary embodiment. The touch coordinate detection unit 11 which is also same as that of the first exemplary embodiment is provided to the visual sense display unit 10.

Figure 5A:
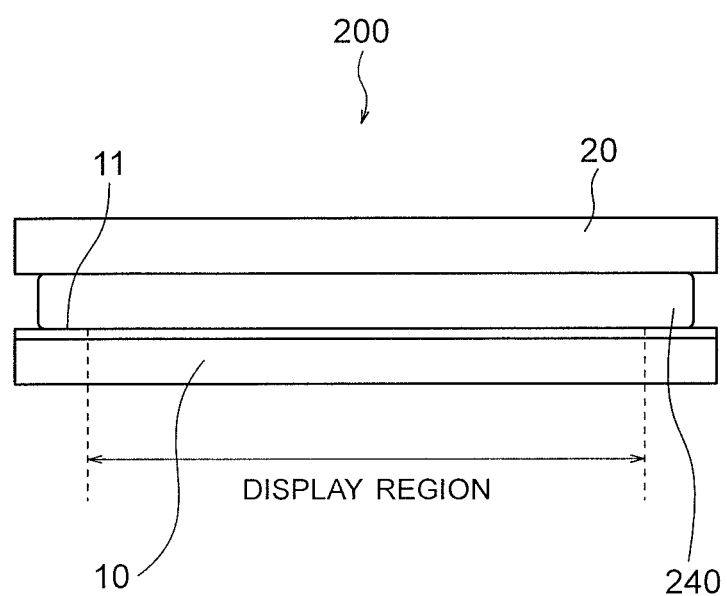
FIG. 5A is an explanatory chart showing a sectional-view structure of the display device shown in FIG. 4.

FIG. 5A is an explanatory chart showing a sectional-view structure of the display device 200 shown in FIG. 4. The display device 200 is also a module. However, it is different from that of the first exemplary embodiment in respect that the visual sense display unit 10 is not housed in a chassis.

Further, the visual sense display unit 10 and the tactual sense presenting unit 20 are joined by using the adhesive tape 240 that is formed with a resin exhibiting transparency for visible light rays. The adhesive tape 240 also known as OCA (Optical Clear Adhesive) exhibits transparency for visible light rays, which is equivalent to the transparency of the OCR described above.

Figure 5B:
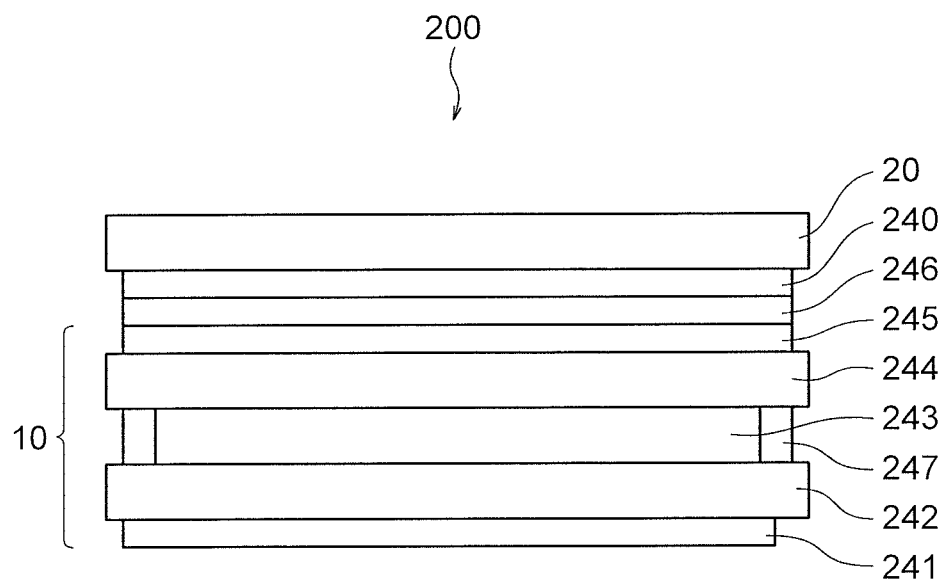
FIG. 5B is an explanatory chart showing more details of the sectional-view structure shown in FIG. 5A.

Details of the display device according to the second exemplary embodiment of the present invention will be described more specifically. FIG. 5B is an explanatory chart showing more details of the sectional-view structure shown in FIG. 5A. In the second exemplary embodiment of the present invention, a TFT color liquid crystal display is employed as the visual sense display unit 10. The visual sense display unit 10 is structured by stacking a first polarization plate 241, a TFT substrate 242, a liquid crystal 243, a color filter substrate 244, and a second polarization plate 245 in this order from a lower layer.

A low-reflection film 246 is glued further on the second polarization plate 245, and the tactual sense presenting unit 20 is laminated thereon via the adhesive tape 240 (OCA). There are elastic optical films such as the low-reflection film 246 and the second polarization plate 245 existing between the tactual sense presenting unit 20 and the color filter substrate 244 to fill the gap between the both. Further, the end part of the liquid crystal 243 is a seal member 247.

By employing such structure, the oscillation propagated through the tactual sense presenting unit can be absorbed by the low-reflection film as well as the polarization plate and the resonance space can be reduced. Thereby, it is possible to suppress the oscillation generated by deformation of the finger from being discharged to the air as a sound wave.

The display device 200 of the second exemplary embodiment is disadvantageous compared to the display device 100 of the first exemplary embodiment in respect that there is a very small range of variations in selecting the materials of the adhesive tape 240. However, it is advantageous in terms of reducing the thickness, size, weight, and the like of the apparatus assembled as a final product.

The display device is essentially housed in some kind of exterior case before it is mounted as a final product. Thus, whether to make the display device as a module that is in a form housed in a chassis or not may be selected depending on the circumstances of manufacturing the final products.

Third Exemplary Embodiment

In addition to the structures of the first and second exemplary embodiments of the present invention described above, a third exemplary embodiment of the present invention employs a structure in which a resin 340 filled between the visual sense display unit 10 and the tactual sense presenting unit 20 is set to have a higher elasticity modulus (Young's modulus) in a fringe part 341 than the elasticity modulus in a center part 342. Further, the resin 340 is a curable resin, and the curing rate in the fringe part 341 is higher than the curing rate in the center part 342.
With this structure, the same effects as those of the first and second exemplary embodiments of the present invention can be acquired and the oscillation absorbing property can be improved further. Hereinafter, this will be described in more details.

Figure 6:
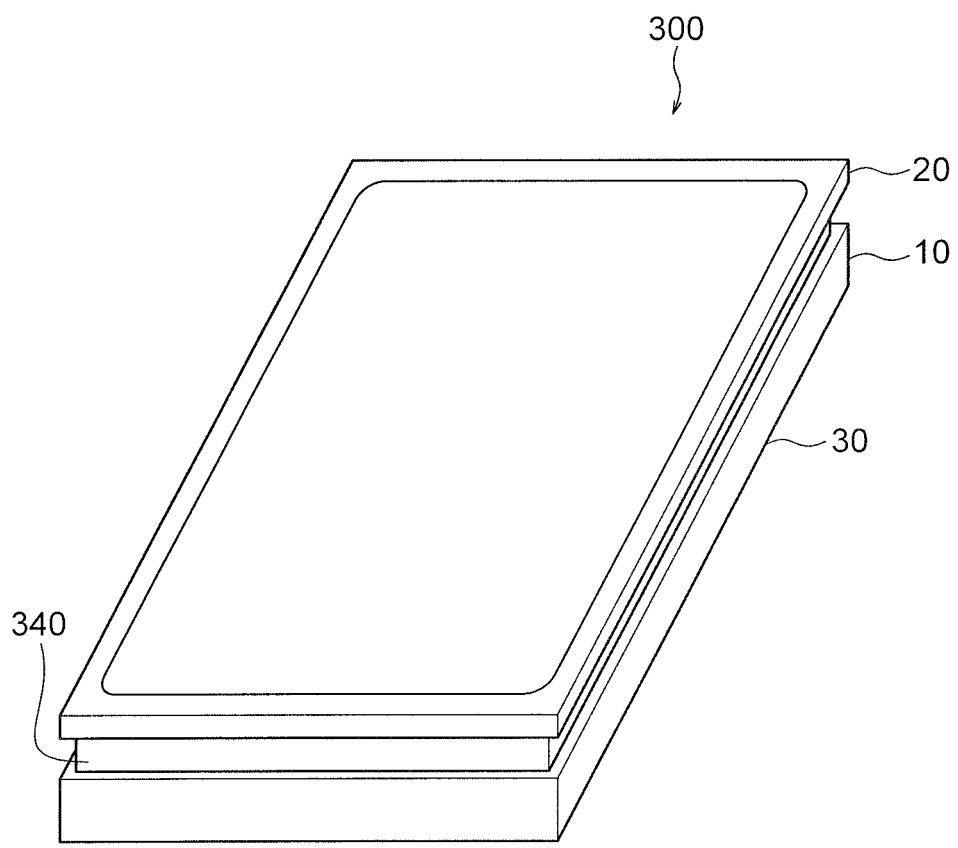
FIG. 6 is a perspective view showing structures of a display device according to a third exemplary embodiment of the present invention.
Figure 7:
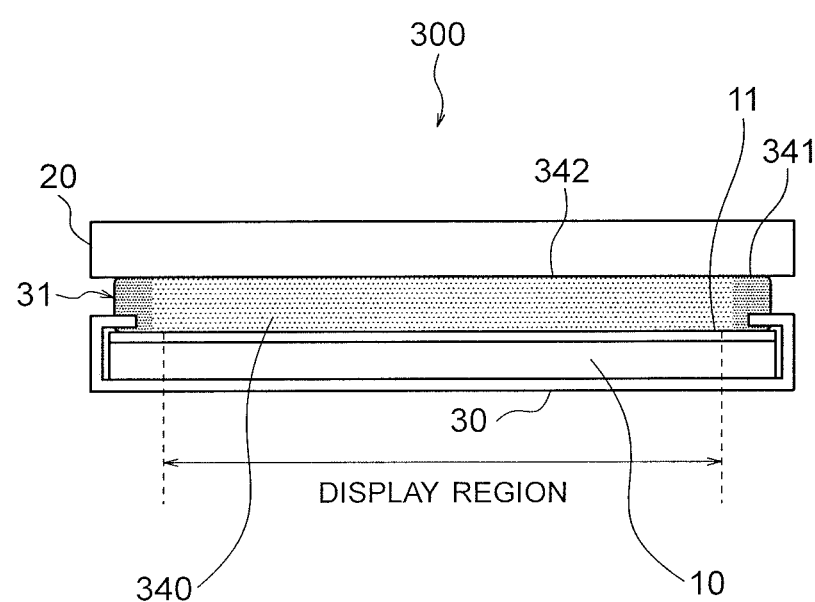
FIG. 7 is an explanatory chart showing a sectional-view structure of the display device shown in FIG. 6.

FIG. 6 is a perspective view showing structures of a display device 300 according to the third exemplary embodiment of the present invention. Further, FIG. 7 is an explanatory chart showing a sectional-view structure of the display device 300 shown in FIG. 6.

The display device 300 is structured by stacking the visual sense display unit 10 and the tactual sense presenting unit 20 same as each of those of the first exemplary embodiment. The touch coordinate detection unit 11 which is also same as that of the first exemplary embodiment is provided to the visual sense display unit 10. Further, as in the case of the first exemplary embodiment, the visual sense display unit 10 is housed in the chassis 30.

Note, however, that the resin 340 filled between the visual sense display unit 10 and the tactual sense presenting unit 20 is set to have a higher elasticity modulus (Young's modulus) in the fringe part 341 than the elasticity modulus in the center part 342.

The resin 340 in a liquid state is applied between the visual sense display unit 10 and the tactual sense presenting unit 20 to laminate the both, and then cured by applying an active energy ray such as an ultraviolet ray, heat, moisture, or the like. Alternatively, a plurality of curing effects may be combined such as curing by applying an ultraviolet ray and heat, or, an ultraviolet ray and moisture. That is, through intentionally changing the progress degree of the curing step (i.e., curing rate) between the fringe part 341 and the center part 342, the elasticity modulus (Young's modulus) can be made different.

In a case where the resin 340 is an ultraviolet curable type, for example, such structure can be achieved by intentionally changing the irradiation time, irradiation direction (irradiate from outer circumference, irradiate from the front, etc.), light amount, and the like of the ultraviolet ray in the curing step. For example, through irradiating the ultraviolet ray towards the gap between the visual sense display unit 10 and the tactual sense presenting unit 20 from the outer circumference to the fringe part 341 and then irradiating the ultraviolet ray to both the fringe part 341 and the center part 342 from the front, the curing rate in the fringe part 341 can be increased than that of the center part 342.

The resin 40 used in the first exemplary embodiment described above is a resin with about 40 kPa elasticity modulus (Young's modulus). This Young's modulus is relatively low (soft) among typical adhesives. For increasing the oscillation absorbing property, the Young's modulus of the resin 340 is desirable to be low. However, if it is too low, the adhesive strength between the visual sense display unit 10 and the tactual sense presenting unit 20 becomes weak, which is an obstacle for assembling the apparatus as a final product.

By employing the above-described structures, the third exemplary embodiment becomes capable of lowering the elasticity modulus (Young's modulus) in the center part 342 to increase the oscillation absorbing property further while securing the adhesive strength between the visual sense display unit 10 and the tactual sense presenting unit 20 in the fringe part 341. It is described above that the structure of the first exemplary embodiment employs different curing rates in the fringe part and the center part of the resin. Naturally, however, the structure of the second exemplary embodiment can also be modified to have such curing rates.

Fourth Exemplary Embodiment

In addition to the structures of the first to third exemplary embodiments of the present invention, a fourth exemplary embodiment of the present invention employs a structure in which an absolute value of a difference between a first frequency and a second frequency is larger than 10 Hz and less than 1000 Hz and both the first and second frequencies are 10000 Hz or larger. With this structure, the same effects as those of the first to third exemplary embodiments of the present invention can be acquired. Further, most of generated oscillation is out of the audible band range, so that unpleasantness caused by the sounding phenomenon can be more easily lightened. Hereinafter, this point will be described in more details.

Figure 8:
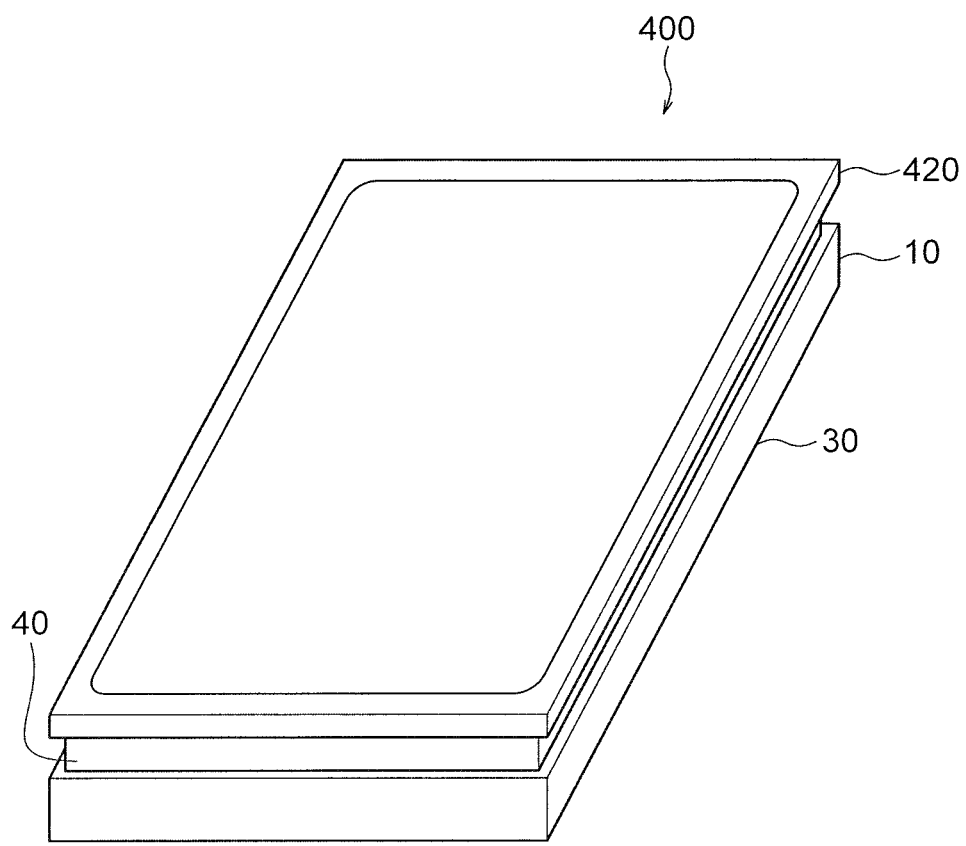
FIG. 8 is a perspective view showing structures of a display device according to a fourth exemplary embodiment of the present invention.
Figure 9:
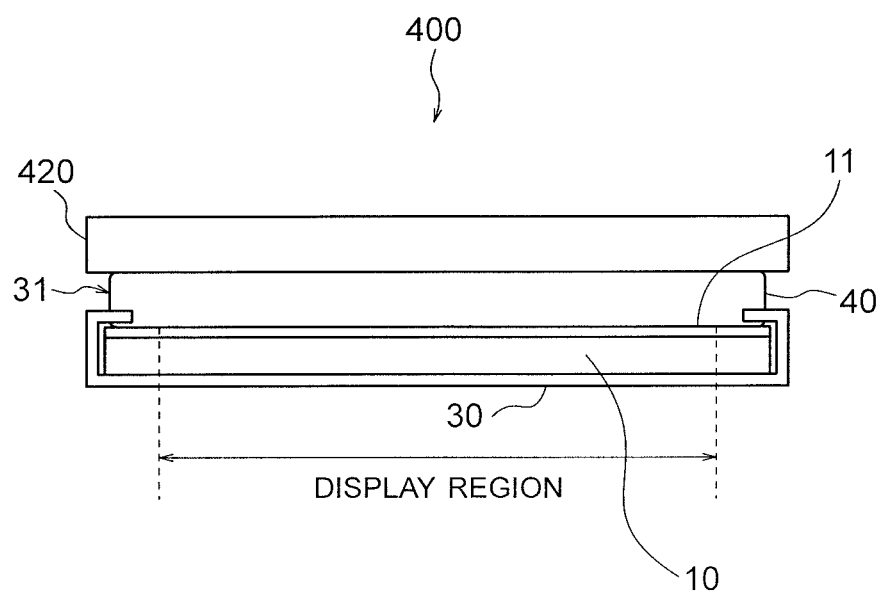
FIG. 9 is an explanatory chart showing a sectional-view structure of the display device shown in FIG. 8.

FIG. 8 is a perspective view showing structures of a display device 400 according to a fourth exemplary embodiment of the present invention. Further, FIG. 9 is an explanatory chart showing a sectional-view structure of the display device 400 shown in FIG. 8. The display device 400 is structured by stacking the visual sense display unit 10 (including the touch coordinate detection unit 11) same as that of the first exemplary embodiment and a tactual sense presenting unit 420 different from that of the first exemplary embodiment. Further, as in the case of the first exemplary embodiment, the display device 400 is housed in the chassis 30 same as that of the first exemplary embodiment, and the resin 40 same as that of the first exemplary embodiment is filled between the visual sense display unit 10 and the tactual sense presenting unit 420.

Figure 10:
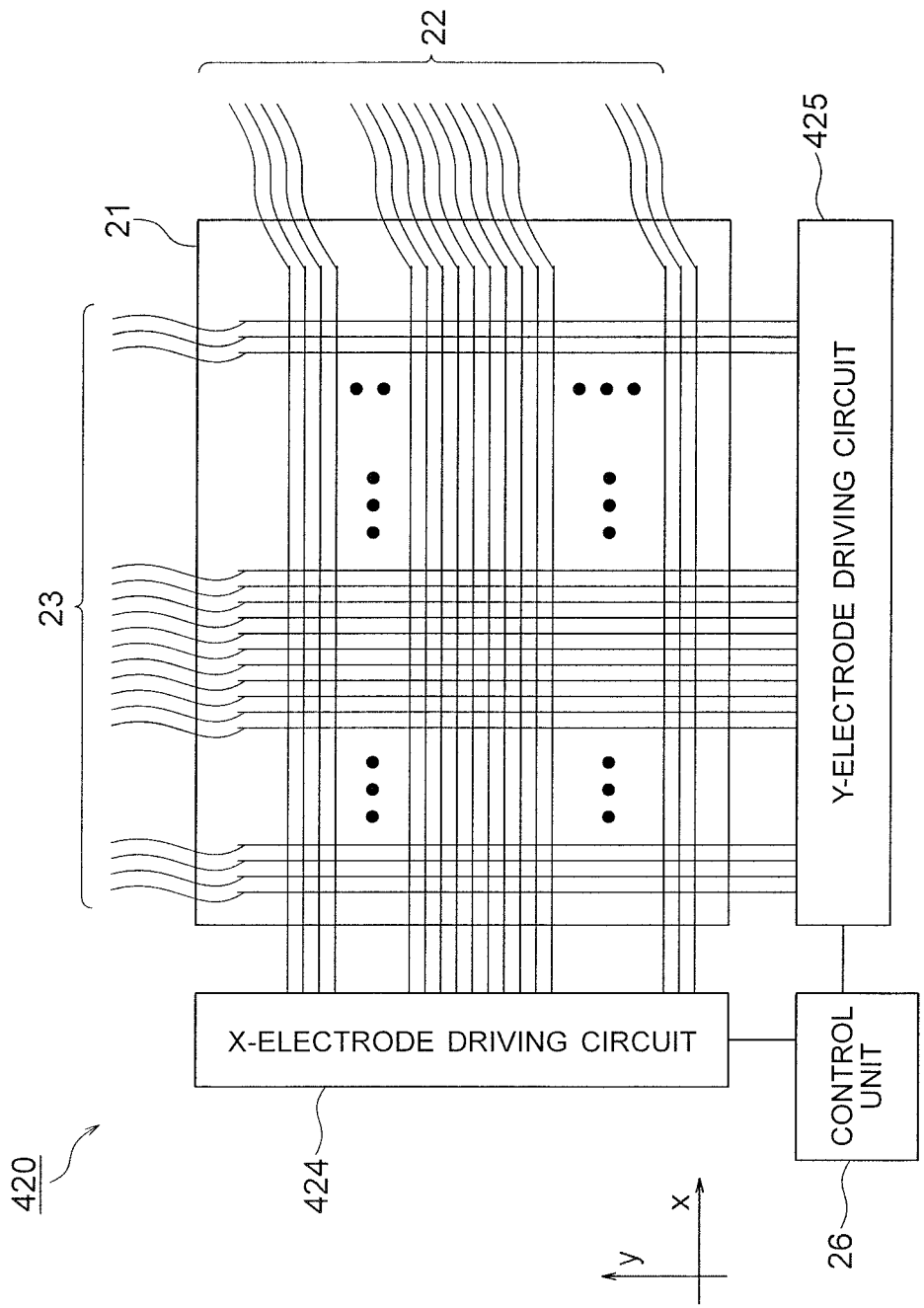
FIG. 10 is an explanatory chart showing a plane view of the structure of the tactual sense presenting unit shown in FIG. 8 and FIG. 9.

FIG. 10 is an explanatory chart showing a plane-view structure of the tactual sense presenting unit 420 shown in FIG. 8 and FIG. 9. The tactual sense presenting unit 420 includes: the flat supporting substrate 21 same as that of the first exemplary embodiment; a plurality of X-electrodes 22; a plurality of Y-electrodes 23; and the control unit 26. Further, the tactual sense presenting unit 420 includes an X-electrode driving circuit 424 and a Y-electrode driving circuit 425 which are different from those of the first exemplary embodiment.

The X-electrode driving circuit 424 and the Y-electrode driving circuit 425 apply voltage signals of required frequencies to the electrodes in the required range out of the X-electrodes 22 or the Y-electrodes 23 according to the control information inputted from the control unit 26. However, the frequencies of the voltage signals applied by the X-electrode driving circuit 424 and the Y-electrode driving circuit 425 to the X-electrodes 22 and the Y-electrodes 23, respectively, are both 10000 Hz or larger and an absolute value of the difference of the frequencies is larger than 10 Hz and less than 1000 Hz (more desirably near 200 Hz).

Figure 11:
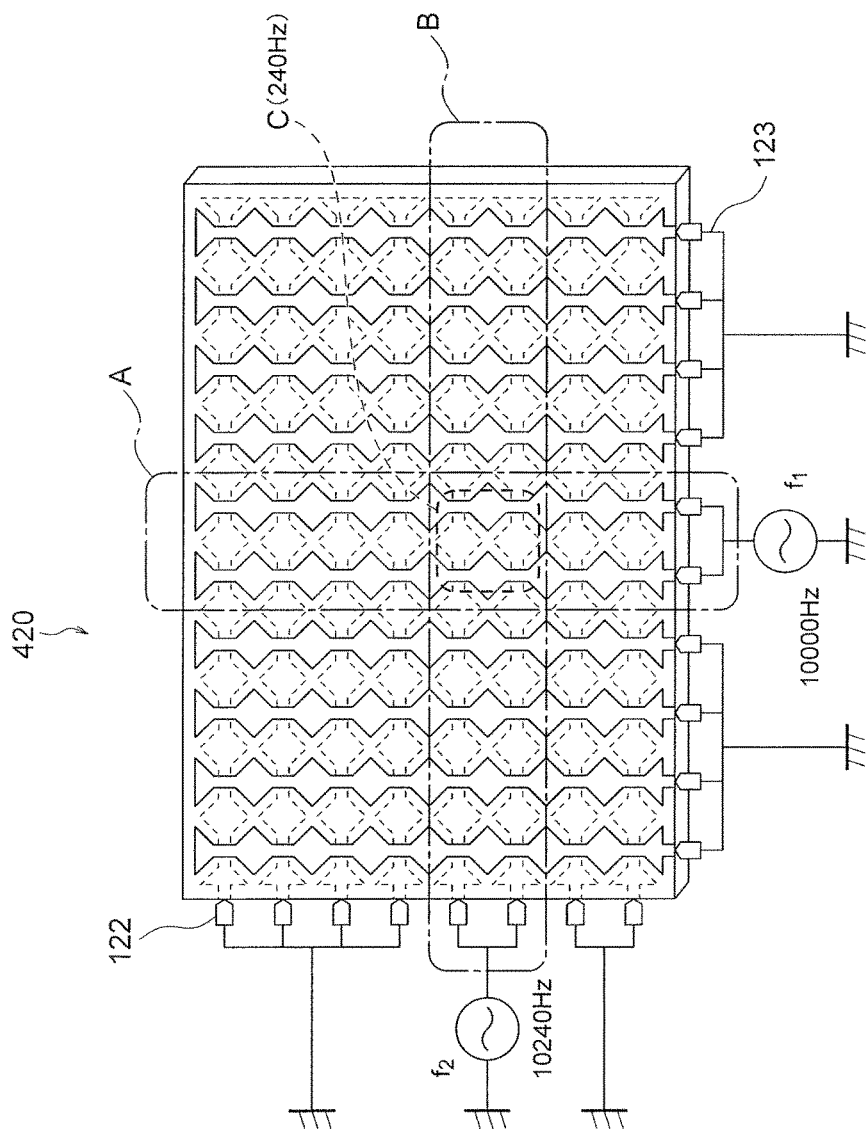
FIG. 11 is an explanatory chart showing drive of the display device shown in FIGS. 8 to 10.

FIG. 11 is an explanatory chart showing drive of the display device 400 shown in FIG. 8 to FIG. 10. In the example shown herein, a voltage signal of a frequency $f_1$=10000 Hz is applied to the those within a range of a target region C among the Y-electrodes 23 and a voltage of a frequency $f_2$=10240 Hz is applied to those within the range of the target region C among the X-electrodes 22 to generate beat oscillation of 240 Hz in the target region C. The other X-electrodes 122 and the Y-electrodes 123 are earthed. Alternatively, signals of frequencies having a difference of 10000 Hz or more with the frequencies $f_1$ and $f_2$ may be applied to each of the electrodes.

Thereby, the frequency of the attraction force generated between with a finger of a human being in the region B that is the region where the voltage signal of the frequency $f_2$=10240 Hz is applied only to the X-electrodes 122 is 20480 Hz that is twice of $f_2$ and the frequency of the attraction force generated between with the finger of the human being in the region A that is the region where the voltage signal of the frequency $f_1$=10000 Hz is applied only to the Y-electrodes 123 is 20000 Hz that is twice of $f_1$ while the beat oscillation generated between with the finger of the human being in the target region C is 240 Hz (with which a sense of texture can be perceived strongly through the skin sensation).

That is, both of the frequencies of the oscillation generated in the regions A and B other than the target region C are equal to or higher than 20 kHz that is the upper limit of the audible band range, so that the sounding phenomenon can be decreased greatly. This means that the oscillation of 240 Hz that is within the audible band range is generated only in the target region. However, the sounding caused thereby is suppressed by the resin 40 by the same effect as that described in the first exemplary embodiment. That is, the fourth exemplary embodiment makes it possible to lighten the unpleasant feeling caused by the sounding phenomenon more easily.

Applied Embodiment

Figure 12:
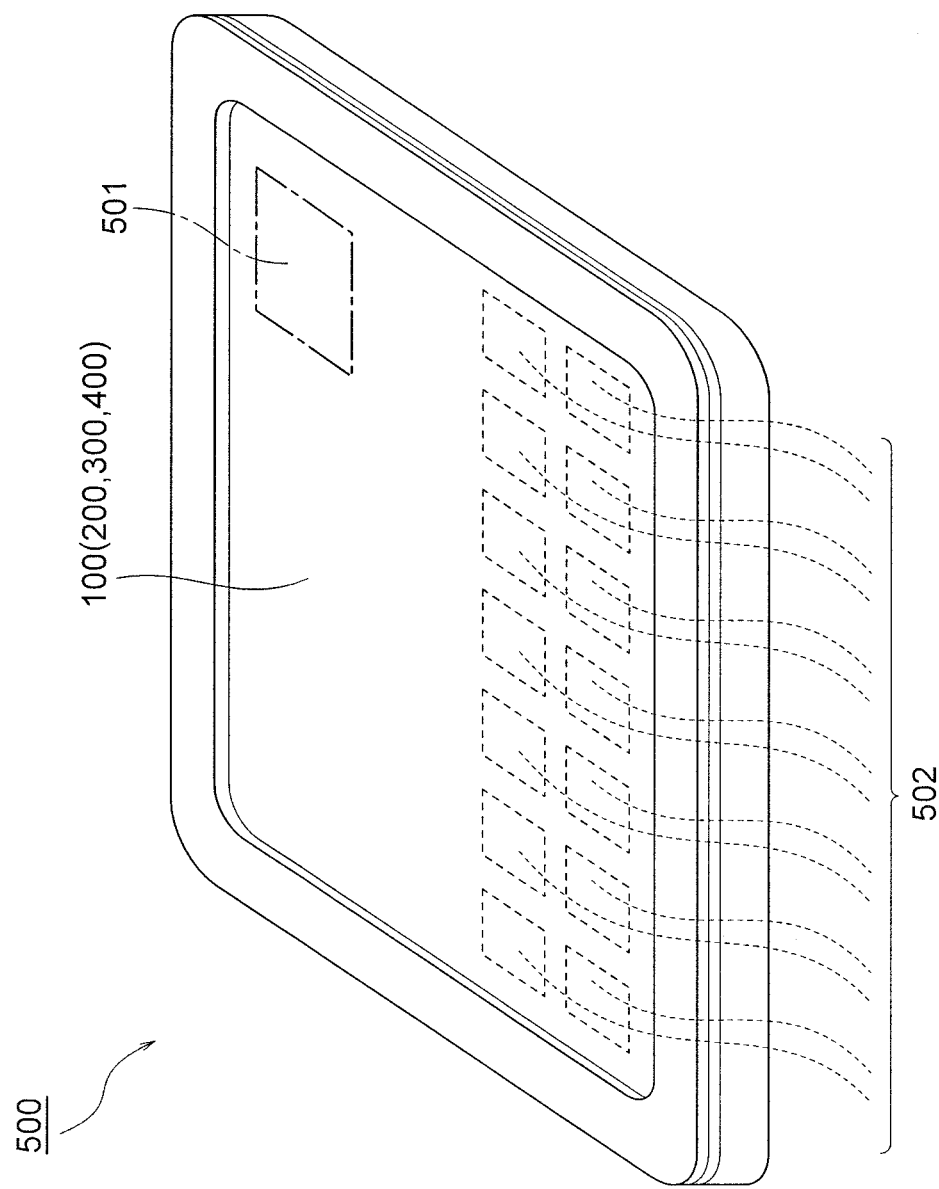
FIG. 12 is an explanatory chart showing structures of an electronic apparatus according to an applied embodiment of the present invention.

FIG. 12 is an explanatory chart showing structures of an electronic apparatus 500 according to an applied embodiment of the present invention. Specifically, the electronic apparatus 500 is a smartphone, a tablet-type electronic book reader, a notebook-type personal computer, or the like.

The electronic apparatus 500 incorporates one of the display devices 100, 150, 200, 300, and 400 as a module for displaying information. In this case, if the mainstream touch panel is employed as the touch coordinate detection unit 11 attached to the visual sense display unit 10, it is not possible to ensure the functional compatibility with the tactual sense presenting unit 20 or 420. Therefore, it is desirable to employ the optical touch panel or the like.

With the electronic apparatus 500, processing results acquired by a built-in processor 501 are displayed on the display device 100 (150, 200, 300, 400). The user performs operation input of the display device according to the display. Note that the electronic apparatus 500 may be such a type which does not include a built-in processor but displays processing results acquired by an external device (e.g., a desktop-type personal computer), and returns operation input according to the display to the external device.

A plurality of operation keys 502 are displayed on the display device (150, 200, 300, 400), and the tactual sense presenting unit 20 or 420 accordingly presents a plurality of isolated senses of texture at the corresponding positions of each of the operation keys 502. The user can find out the positions of the operation keys according to the senses of texture, thereby making it possible to perform key input without greatly relying on the visual sense.

While the present invention has been described by referring to the specific embodiments shown in the drawings, the present invention is not limited only to the embodiments shown in the drawings. Any known structures can be employed as long as the effects of the present invention can be achieved therewith.

While a part of or the entire part of the exemplary embodiments can be summarized exemplary embodiments as in following Supplementary Notes, the present invention is not necessarily limited to those structures.

Supplementary Note 1

A display device, including:
a plate-type visual sense display unit which displays a screen by an image signal supplied from outside; and a plate-type tactual sense presenting unit which is disposed to oppose to the visual sense display unit and presents a tactual sense that can be perceived by a user on the screen, wherein:
the tactual sense presenting unit includes electrodes and an insulating film that covers the electrodes and is structured to present the tactual sense to the user by generating an electrostatic force between the electrodes and the user by a voltage signal given to the electrodes from outside; and
an elastic body exhibiting transparency for a visible light ray is filled in a gap between the visual sense display unit and the tactual sense presenting unit.

Supplementary Note 2

The display device as depicted in Supplementary Note 1, wherein:
the tactual sense presenting unit includes: a supporting substrate, a plurality of mutually parallel X-electrodes extended along a first direction on the supporting substrate, a plurality of mutually parallel Y-electrodes which are extended along a second direction on the supporting substrate and insulated mutually from the X-electrodes; and
a driving circuit which applies a voltage signal of a first frequency to the X-electrode corresponding to information of a target region inputted from outside among each of the X-electrodes, applies a voltage signal of a second frequency to the Y-electrode corresponding to information of the target region among each of the Y-electrodes, and generates electric beat oscillation in the target region by an absolute value of a difference between the first and second frequencies.

Supplementary Note 3

The display device as depicted in Supplementary Note 2, wherein:
the first and second frequencies are both 500 Hz or higher; and
there is a period where the absolute value of the difference between the first and second frequencies is larger than 10 Hz and less than 1000 Hz.

Supplementary Note 4

The display device as depicted in Supplementary Note 1, wherein:
a touch coordinate detection unit for detecting a content of a touch operation done by the user on an operation screen is provided to the visual sense display unit.

Supplementary Note 5

The display device as depicted in Supplementary Note 1, wherein
the tactual sense presenting unit includes a tactual sense presenting function which generates an electrostatic force that can be perceived by the user by input of the voltage signal at a position corresponding to a displayed object that is displayed on an operation screen.

Supplementary Note 6

The display device as depicted in Supplementary Note 1, wherein
the elastic body is filled in the gap in a layered state between the visual sense display unit and the tactual sense presenting unit, the elastic body is covering an entire display region of the visual sense display unit.

Supplementary Note 7

The display device as depicted in Supplementary Note 6, including a chassis which has an aperture for exposing the entire display region and houses the visual sense display unit, wherein the elastic body is filled in the gap in a layered state between the visual sense display unit and the tactual sense presenting unit, the elastic body is covering an entire part of the aperture.

Supplementary Note 8

The display device as depicted in Supplementary Note 1, wherein the visual sense display unit and a supporting structural body for supporting the visual sense display unit are joined by a non-elastic body.

Supplementary Note 9

The display device as depicted in Supplementary Note 1, wherein the elastic body is an active energy type curable resin, a thermosetting resin, a moisture curable resin, or a composite type curable resin that is a composition of those resins.

Supplementary Note 10

The display device as depicted in Supplementary Note 1, wherein the elastic body filled between the gap in a layered state between the visual sense display unit and the tactual sense presenting unit is set to have a higher elasticity modulus in a fringe part than an elasticity modulus in a center part.

Supplementary Note 11

The display device as depicted in Supplementary Note 10, wherein the elastic body is a curable resin, and a curing rate in the fringe part is higher than a curing rate in the center part.

Supplementary Note 12

A display device, including:

a plate-type visual sense display unit which displays a screen by an image signal supplied from outside; and a tactual sense presenting unit which is disposed to oppose to the visual sense display unit and presents a tactual sense that can be perceived by a user on the screen, wherein:

the tactual sense presenting unit includes electrodes and an insulating film that covers the electrodes and is structured to present the tactual sense to the user by generating an electrostatic force between the electrodes and the user by a voltage signal given to the electrode from outside; and an elastic body exhibiting transparency for a visible light ray is filled in a gap between the visual sense display unit and the tactual sense presenting unit so that sounding is suppressed.

Supplementary Note 13

A tactual sense presenting unit, including:

a supporting substrate; a plurality of mutually parallel X-electrodes extended along a first direction on the supporting substrate; a plurality of mutually parallel Y-electrodes which are extended along a second direction on the supporting substrate and insulated mutually from the X-electrodes; and a driving circuit which applies a voltage signal of a first frequency to the X-electrode corresponding to information of a target region inputted from outside among each of the X-electrodes, applies a voltage signal of a second frequency to the Y-electrode corresponding to information of the target region among each of the Y-electrodes, and generates an electric beat oscillation in the target region by an absolute value of a difference between the first and second frequencies, wherein:

the absolute value of the difference between the first and second frequencies is larger than 10 Hz and less than 1000 Hz; and the first and second frequencies are both 10000 Hz or higher.

Supplementary Note 14

An electronic apparatus, including the display device as depicted in any one of Supplementary Notes 1 to 13 built-in for displaying information.

INDUSTRIAL APPLICABILITY

The present invention can be applied to all the electronic apparatuses to which a touch panel is loaded. Particularly, the present invention is suited for being applied to apparatuses that are assumed to be owned or used by individuals and also used in places such as offices where silence is maintained. More specifically, the present invention is suited for being applied to smartphones, tablet terminals, notebook-type personal computers, portable game machines, music players, and the like.

What is claimed is:

1. A display device, comprising:
a plate-type visual sense display unit which displays a screen by an image signal supplied from outside; and a plate-type tactual sense presenting unit which is disposed to oppose to the visual sense display unit and presents a tactual sense that can be perceived by a user on the screen, wherein:
the tactual sense presenting unit comprises electrodes and an insulating film that covers the electrodes and is structured to present the tactual sense to the user by generating an electrostatic force between the electrodes and the user by a voltage signal given to the electrodes from outside; and
the display device further comprises a resin exhibiting transparency for a visible light ray and having an elasticity modulus less than 100 kPa, which is filled in a gap between the visual sense display unit and the tactual sense presenting unit.

2. The display device as claimed in claim 1, wherein:
the tactual sense presenting unit comprises: a supporting substrate, a plurality of mutually parallel X-electrodes extended along a first direction on the supporting substrate, a plurality of mutually parallel Y-electrodes which are extended along a second direction on the supporting substrate and insulated mutually from the X-electrodes; and
a driving circuit which applies a voltage signal of a first frequency to the X-electrode corresponding to information of a target region inputted from outside among each of the X-electrodes, applies a voltage signal of a second frequency to the Y-electrode corresponding to information of the target region among each of the Y-electrodes, and generates electric beat oscillation in the target region by an absolute value of a difference between the first and second frequencies.

3. The display device as claimed in claim 2, wherein:
the first and second frequencies are both 500 Hz or higher; and
there is a period where the absolute value of the difference between the first and second frequencies is larger than 10 Hz and less than 1000 Hz.

4. The display device as claimed in claim 1, wherein:
a touch coordinate detection unit for detecting a content of a touch operation done by the user on an operation screen is provided to the visual sense display unit.

5. The display device as claimed in claim 1, wherein the tactual sense presenting unit includes a tactual sense presenting function which generates an electrostatic force that can be perceived by the user by input of the voltage signal at a position corresponding to a displayed object that is displayed on an operation screen.

6. The display device as claimed in claim 1, wherein the elastic body is filled in the gap in a layered state between the visual sense display unit and the tactual sense presenting unit, the elastic body is covering an entire display region of the visual sense display unit.

7. The display device as claimed in claim 6, comprising a chassis which has an aperture for exposing the entire display region and houses the visual sense display unit, wherein
the elastic body is filled in the gap in a layered state between the visual sense display unit and the tactual sense presenting unit, the elastic body is covering an entire part of the aperture.

8. The display device as claimed in claim 1, wherein the visual sense display unit and a supporting structural body for supporting the visual sense display unit are joined by a non-elastic body.

9. The display device as claimed in claim 1, wherein the elastic body is an active energy type curable resin, a thermosetting resin, a moisture curable resin, or a composite type curable resin that is a composition of those resins.

10. The display device as claimed in claim 1, wherein the elastic body filled between the gap in a layered state between the visual sense display unit and the tactual sense presenting unit is set to have a higher elasticity modulus in a fringe part than an elasticity modulus in a center part.

11. The display device as claimed in claim 10, wherein the elastic body is a curable resin, and a curing rate in the fringe part is higher than a curing rate in the center part.

12. The display device as claimed in claim 1, further comprising:
a resin exhibiting transparency for a visible light ray and having an elasticity modulus less than 100 kPa, which is filled in a gap between the visual sense display unit and the tactual sense presenting unit so that sounding is suppressed.

13. An electronic apparatus, comprising the display device as claimed in claim 1 built-in for displaying information.

* * * * *